(12) United States Patent  (10) Patent No.: US 8,407,701 B2
Gaertner et al.  (45) Date of Patent: Mar. 26, 2013

(54) FACILITATING QUIESCE OPERATIONS WITHIN A LOGICALLY PARTITIONED COMPUTER SYSTEM

(75) Inventors: Ute Gaertner, Schoenaich (DE); Lisa C. Heller, Rhinebeck, NY (US); Jennifer A. Navarro, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 12/822,818

(22) Filed: Jun. 24, 2010

(65) Prior Publication Data

US 2011/0321048 A1  Dec. 29, 2011

(51) Int. Cl.
*G06F 9/455* (2006.01)
*G06F 9/46* (2006.01)
*G06F 1/24* (2006.01)
*G06F 3/00* (2006.01)
*G06F 9/44* (2006.01)
*G06F 13/00* (2006.01)

(52) U.S. Cl. ............ 718/1; 718/100; 713/100; 719/318

(58) Field of Classification Search .................. None
See application file for complete search history.

(56) References Cited

U.S. PATENT DOCUMENTS

| | | | |
|---|---|---|---|
| 5,551,013 A | 8/1996 | Beausoleil et al. | |
| 5,574,873 A | 11/1996 | Davidian et al. | |
| 5,790,825 A | 8/1998 | Traut | |
| 6,009,261 A | 12/1999 | Scalzi et al. | |
| 6,308,255 B1 | 10/2001 | Gorishek et al. | |
| 6,463,582 B1 | 10/2002 | Lethin et al. | |
| 6,996,698 B2 | 2/2006 | Slegel et al. | |
| 7,020,761 B2 | 3/2006 | Siegel et al. | |
| 7,284,100 B2 | 10/2007 | Slegel et al. | |
| 7,530,067 B2 | 5/2009 | Slegel et al. | |
| 2009/0216928 A1 | 8/2009 | Heller et al. | |
| 2009/0216929 A1 | 8/2009 | Heller et al. | |
| 2009/0217264 A1 | 8/2009 | Heller et al. | |
| 2009/0217269 A1 | 8/2009 | Heller et al. | |
| 2009/0240908 A1 | 9/2009 | Slegel et al. | |

OTHER PUBLICATIONS

"z/Architecture Principles of Operation," IBM Publication No. SA22-7832-07, Feb. 2009, 8th Edition.

*Primary Examiner* — Andy Ho
*Assistant Examiner* — Craig Dorais
(74) *Attorney, Agent, or Firm* — John E. Campbell, P.A.; Kevin P. Radigan, Esq.; Heslin Rothenberg Farley & Mesiti P.C.

(57) ABSTRACT

A facility is provided for processing to distinguish between a full conventional (or total system) quiesce request within a logically partitioned computer system, which requires all processors of the computer system to remain quiesced for the duration of the quiesce-related operation, and a new early-release conventional quiesce request, which is associated with fast-quiesce request utilization. In accordance with the facility, once all processors have quiesced responsive to a pending quiesce request sequence, the processors are allowed to block early-release conventional quiesce interrupts and to continue processing if there is no total system quiesce request in the pending quiesce request sequence.

20 Claims, 21 Drawing Sheets

FAST - QUIESCE SYSOP COMMAND

FULL CONVENTIONAL SYSOP COMMAND

EARLY - RELEASE CONVENTIONAL SYSOP COMMAND

FACILITATING QUIESCE OPERATIONS WITHIN A LOGICALLY PARTITIONED COMPUTER SYSTEM

BACKGROUND

This invention relates, in general, to facilitating request processing within a logically partitioned computing system, and more particularly, to facilitating quiesce request processing within a logically partitioned computer system.

The processing of a request by one processor may affect one or more other processors of a computer system. For example, in a Symmetric Multi-Processor (SMP) system based on the z/Architecture® of International Business Machines Corporation, Armonk, N.Y., various broadcast purge operations, such as Invalidate Page Table Entry (IPTE), Invalidate DAT Table Entry (IDTE), Set Storage Key Extended (SSKE), and Compare and Swap and Purge (CSP) instructions, require entries of one or more buffers (e.g., Translation Lookaside Buffers (TLBs)) to be removed from the buffers in all processors of the computing environment. Furthermore, the architecture requires the buffers to be purged atomically, such that no processor can observe a new TLB entry, while some other processor observes an old entry. Many other computer architectures also provide a similar mechanism.

One common implementation for a broadcast purge operation includes the following: 1) processors are quiesced (i.e., most normal processing operations are suspended, including accessing the TLB); 2) TLBs on the processors are purged of the appropriate entries; 3) the common resource is changed (e.g., a page table entry in storage for IPTE or a storage key for SSKE); and 4) finally, the quiesce is released and the processors continue normal processing activities. Obviously, this implementation might have a performance impact, especially for large SMP configurations, since essentially all processors of the system are to be quiesced for the duration of the operation. In particular, it is common that one processor may be executing a long running instruction that is not interruptible, so that it cannot reach the quiesce state for a period of time, and other processors are required to wait for this one processor to reach the quiesce state before the steps described above can be completed.

BRIEF SUMMARY

The shortcomings of the prior art are overcome and advantages are provided through the provision of a computer program product for processing requests of a computer system. The computer program product includes a computer readable storage medium readable by a processing circuit and storing instructions for execution by the processing circuit for performing a method. The method includes, for instance: determining whether a quiesce request received at a processor of the computer system is of a fast-quiesce type, and responsive to the quiesce request being of the fast-quiesce type, handling a fast-quiesce type interruption at the processor; responsive to the quiesce request being other than of the fast-quiesce type, setting an I-AM-QUIESCED indicator and a HOLD-QUSYS indicator at the processor, in part, to inform a system controller of the computer system that the processor has entered quiesced state, and determining whether other processors of the computer system have entered quiesced state; and responsive to other processors of the computer system having entered quiesced state, determining by the processor whether any total system quiesce requests are pending, and responsive to no total system quiesce requests being pending, blocking system quiesce interrupts at the processor for a pending quiesce request sequence, and thereafter, resetting the I-AM-QUIESCED indicator, and the HOLD-QUSYS indicator at the processor to enable processing at the processor.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
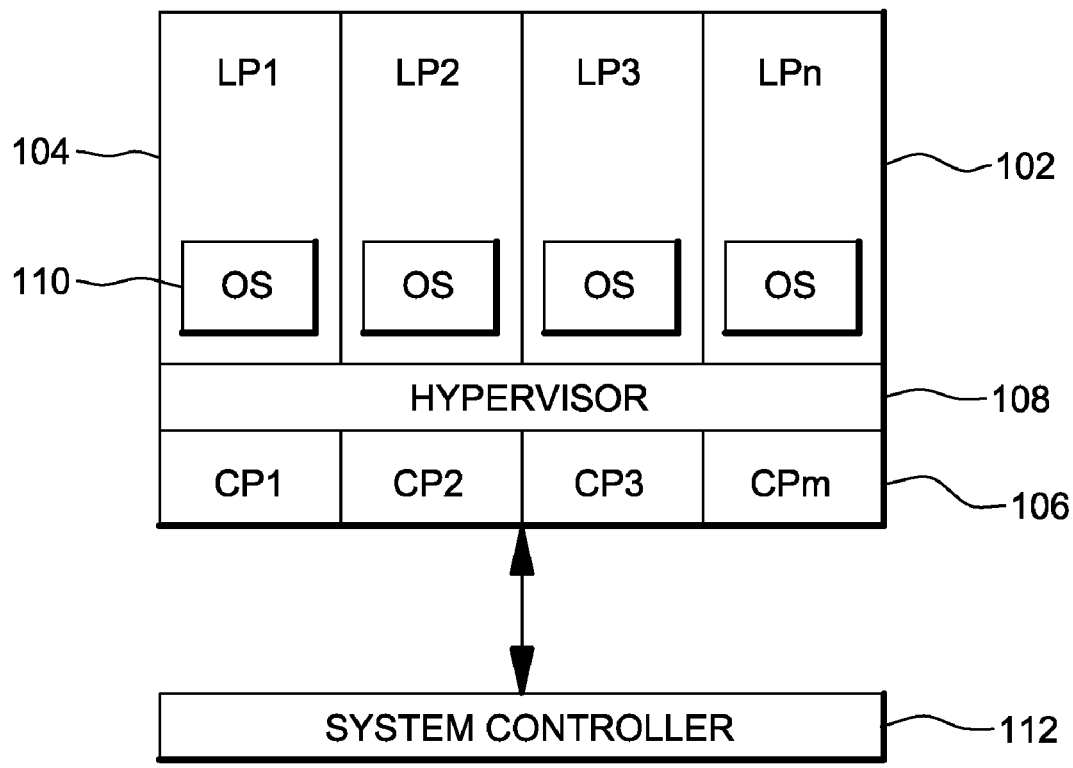
FIG. 1 depicts one embodiment of a logically partitioned computer system to utilize improved quiesce processing, in accordance with an aspect of the present invention.

Conventionally, a quiesce operation forces all appropriate processors in a multiprocessor computer system to suspend most normal processing operations, while the processor initiating the quiesce operation affects a change in the system state. The conventional quiesce operation utilizes system operations to communicate among the processors. Conventionally, a SET conventional quiesce command is issued by an initiating processor to indicate that the processor requests all other processors to enter a "quiesced state". Having all processors enter a quiesced state ensures that the processors not currently using the common resource to be updated, and that they are not making or using any buffered copies dependent on that resource. After the necessary invalidation and resource updates are complete, a RESET conventional quiesce command is issued by the processor previously issuing the SET conventional quiesce command, and which has now completed the operation for which the quiesced state was required.

This conventional quiesce mechanism is very flexible, and includes the ability to handle multiple simultaneous quiesce requests. It is possible for multiple processors to be requesting a quiesced state at the same time, that is, multiple conventional quiesce initiators may be accommodated during a given conventional quiesce sequence, but only one processor is allowed to be changing the system state at a time. In this case, the processors are given quiesce priority one processor at a time until all requests of the sequence have been reset. System performance may suffer, however, using this technique, particularly on large SMP configurations, since essentially all processors must be quiesced for the duration of the pending quiesce request sequence.

In a computing environment based, for instance, on the z/Architecture® offered by International Business Machines Corporation, quiesce request operations are required for a number of processes, including purging the caches and synchronizing processors for complex initialization and recovery operations. However, the quiesce operations are principally associated with the IPTE, IDTE, SSKE and CSP(G) instructions, which are referred to herein as fast-quiesce operations or instructions. In these cases, buffered entries in the translation look-aside buffers (TLBs) and/or in the access-register-translation look-aside buffer (ALB), which are dependent on the resource being updated, are invalidated, and the common resource which is updated is a translation table entry in storage for IPTE, IDTE, CSP or CSP(G), or a storage key for SSKE.

As an enhancement to system performance, a second quiesce mechanism has been defined for use with IPTE, SSKE, IDTE and CSP(G) instructions only. This second quiesce mechanism, referred to herein as the fast-quiesce type, uses the broadcast fast-quiesced system operation (SYSOP) commands to initiate directly the quiesce function on the receiving processors without waiting for all processors of the computer system to be quiesced. The receiving processors (i.e., those processors besides the initiating processor executing the instruction and the associated fast-quiesce SYSOP) honor the fast-quiesce request and invalidate the required TLB or ALB entries. They are then allowed to continue execution with the restriction that they are inhibited from performing certain operations (related to the required system update) until the entire overall quiesce function is completed. Only one fast-quiesce operation per partition is allowed in the system at any one time.

A conventional quiesce mechanism continues to be used in any situation besides IPTE, IDTE, SSKE and CSP(G) that requires a system quiesce. In addition, it is used by the IPTE, IDTE, SSKE and CSP(G) when the fast-quiesce hardware in the system controller is busy, and is unable to successfully complete a fast-quiesce operation for a specified number of attempts.

As noted, during conventional quiesce processing, all necessary processors remain quiesced (i.e., essentially doing no useful work) until the initiating processor has completed its operation. In a large system, particularly in a large single-image system, the conventional quiesce is used relatively often to resolve fast-quiesce processing conflicts. Disclosed herein, in one aspect, is an enhanced quiesce processing approach which reduces processing overhead associated with quiesce operations in this situation. As explained below, a further qualification is associated with a conventional quiesce operation to define a new quiesce type, referred to herein as an early-release conventional quiesce (or alternatively, as an early-release system quiesce). Generally stated, processing disclosed herein distinguishes between a conventional (or total system) quiesce, which requires all appropriate processors of the computer system to remain quiesced for the duration of the operation, and an early-release conventional quiesce, which as explained below, is associated with a fast-quiesce request utilization. In an early-release conventional quiesce, once all appropriate processors have responded to the quiesce request, the processors are allowed to continue processing if there is no full conventional quiesce request pending. Since the majority of conventional quiesce requests will fall into the early-release conventional quiesce type, this should significantly improve overall system performance and minimize the time spent in the serialized state.

As used herein, the Invalidate Page and DAT Table Entries (IPTE & IDTE), Set Storage Key Extended (SSKE), and Compare and Swap and Purge (CSP/G) instructions are referred to as quiesce-dependent instructions or operations. There are instances in each of these operations where a quiesce, or system serialization, operation is not required, but in the examples discussed herein, reference is made to those cases where a quiesce is required. In one implementation described herein, each zone (or partition) has a zone number associated with it. At a high level, this zone number is used to identify processors to which a quiesce request applies.

One embodiment of a computing environment 100 incorporating and using one or more aspects of the present invention is described with reference to FIG. 1. Computing environment 100 is based, for instance, on the z/Architecture® offered by International Business Machines Corporation, Armonk, N.Y. The z/Architecture® is described in an IBM® publication entitled, "z/Architecture® Principles of Operation," IBM Publication No. SA22-7832-07, February 2009, $8^{th}$ Edition, which is hereby incorporated herein by reference in its entirety. In one example, a computing environment based on the z/Architecture includes an eServer zSeries, offered by International Business Machines Corporation, Armonk, N.Y.

As one example, computing environment 100 includes a central processor complex (CPC) 102 coupled to a system controller 112. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode or firmware) keeps a program in one logical partition 104 from interfering with a program in a different logical partition 104. This allows several different logical partitions 104 to operate on a single or multiple physical processors in a time sliced manner. In this particular example, each logical partition 104 has a resident operating system (OS) 110, which may differ for one or more logical partitions 104. In one embodiment, operating system 110 is the z/OS operating system, offered by International Business Machines Corporation, Armonk, N.Y.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106. One example of hypervisor 108 is the Processor Resource/Systems Manager (PR/SM), offered by International Business Machines Corporation, Armonk, N.Y.

System controller 112, which is coupled to the central processor complex, includes centralized logic responsible for arbitrating between different processors issuing requests. For instance, when system controller 112 receives a quiesce request, it determines that the requester is the initiating processor for that request and that the other processors are receiving processors; it broadcasts messages; and otherwise, handles requests. Further details of this processing are described below with reference to FIGS. 4A & 4B.

Other types of computing environments can also benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 2:
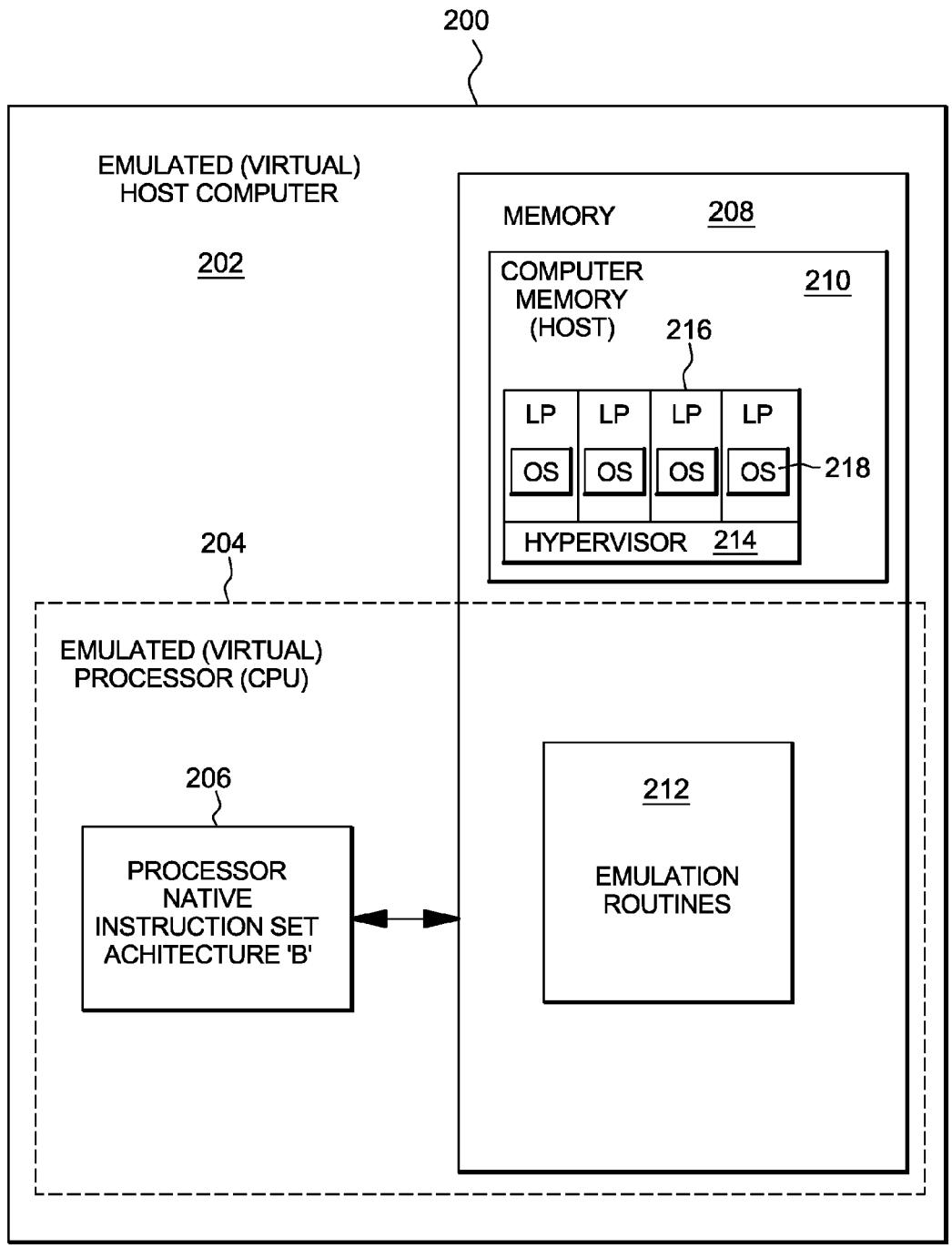
FIG. 2 depicts an embodiment of an emulated host computer system to incorporate and use one or more aspects of the present invention.

In the example of FIG. 2, an emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 212 may include support for this instruction, and for executing a sequence of guest instructions in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

FIG. 3 depicts one embodiment of commands and relevant fields used to communicate quiesce SYSOPs throughout a computer system, such as described herein. Each command 310, 320, 330 indicates that it is a broadcast operation (i.e., it is to be broadcast to all the processors in the system), and that it is a fast-quiesce command, a full conventional (or total system) quiesce command or an early-release conventional (or early-release system) quiesce command.

Figure 3A:
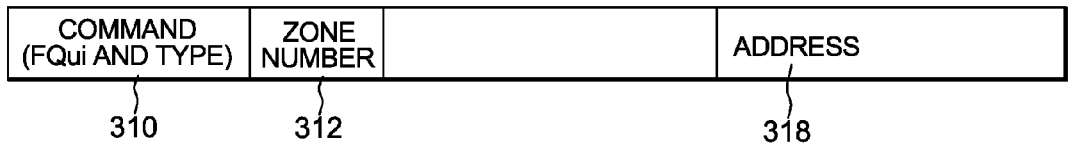
FIG. 3A depicts one embodiment of a fast-quiesce system operation (SYSOP) command to be employed, in accordance with an aspect of the present invention.

FIG. 3A shows a subset of the command fields provided with a fast-quiesce (FQui) request. In this case, the command 310 also specifies the type of fast-quiesce request (SSKE, IPTE, IDTE, etc.) which specifies the invalidation that is required by the processor. In addition, a field indicates the partition zone-number of the initiator 312 and an address field 318 that further qualifies the invalidation required (for example, the storage address for SSKE or the page index for IPTE).

Figure 3B:
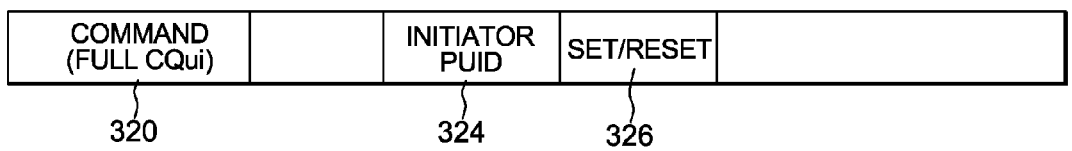
FIG. 3B depicts one embodiment of a full conventional (or total system) SYSOP command to be employed, in accordance with an aspect of the present invention.
Figure 3C:
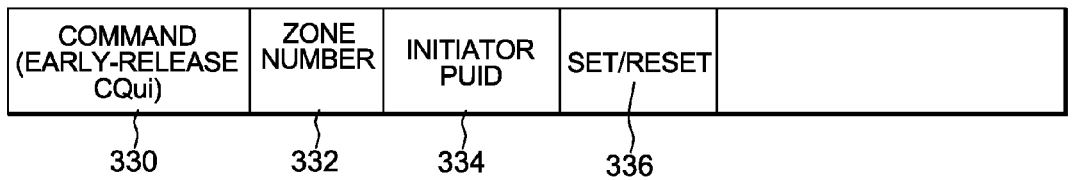
FIG. 3C depicts one embodiment of an early-release conventional (or early-release system) SYSOP command, in accordance with an aspect of the present invention.

FIG. 3B shows a subset of the command fields provided with a full conventional quiesce request. Besides the command 320, there is also an indication of the processor ID (PUID) of the initiating processor 324 and an indication of whether the command is a SET or RESET 326 full conventional request. FIG. 3C depicts a subset of the command fields provided with an early-release conventional quiesce request. This command provides the processor ID 334 and the SET or RESET indicator 336, as for the full conventional request. In addition, the early-release conventional request includes the zone number of the initiator 332.

Figure 4A:
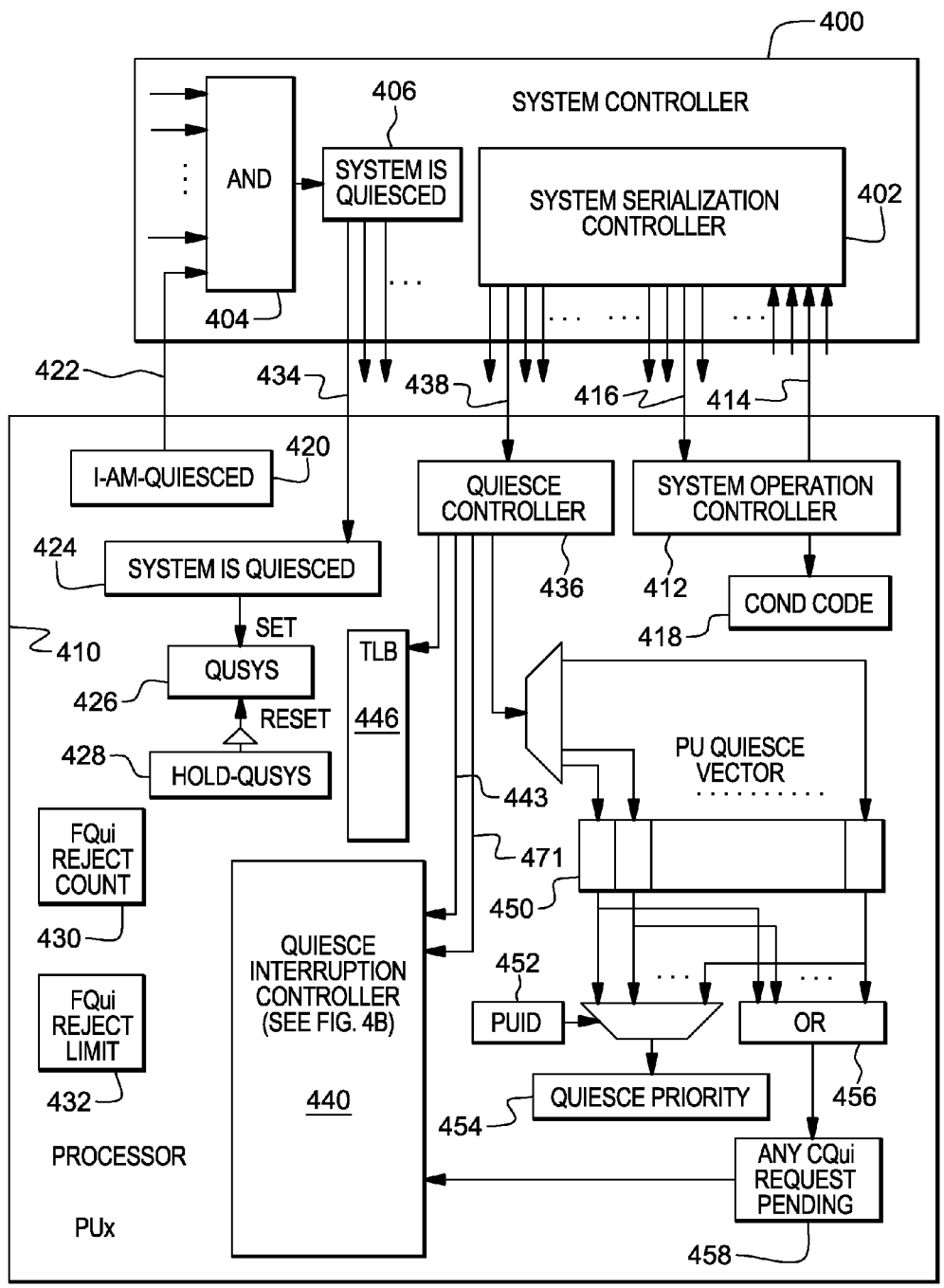
FIGS. 4A & 4B depict a more detailed embodiment of a processor and system controller of a computer system utilizing quiesce request processing, in accordance with an aspect of the present invention.
Figure 4B:
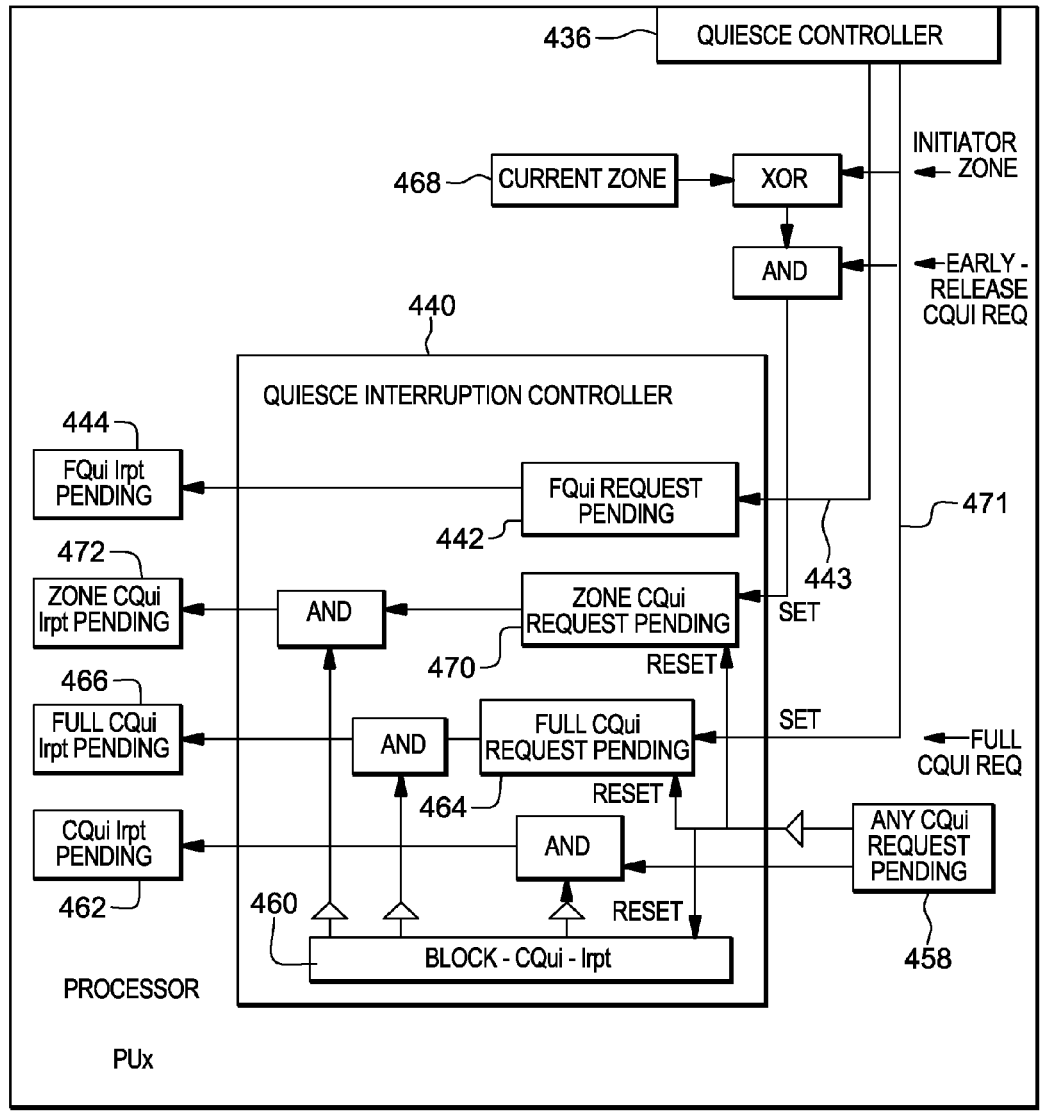

FIGS. 4A & 4B depict an example of a system controller 400 coupled to a plurality of central processors (CPUs) 410, only one of which is illustrated. Those skilled in the art will understand that more than one processor 410 may be coupled to system controller 400.

Referring collectively to FIGS. 4A & 4B, system Controller 400 includes various controls including, for instance, system serialization controls 402. The system serialization controls 402, among other things, are used to ensure that operations that are to be serialized, such as those used by the Invalidate Page Table Entry (IPTE), Invalidate DAT Table Entry (IDTE), Set Storage Key Extended (SSKE), or Compare and Swap and Purge (CSP and CSPG) instructions, are serialized, such that only one such instruction is in progress in any one partition at any one time in the computing environment. It also monitors the sequence of events for that operation.

System controller 400 is coupled to each central processor 410 via various interfaces. For instance, an interface 414 to the controller 400 is used by the firmware in a central processor to send "control" commands from the System Operation controller 412, which specify an action to be taken by system controller 400 and in some cases by the system serialization controls 402. (Note that, as used herein, "firmware" includes, for example, the microcode, millicode and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.) Another interface is a response bus 416, which is used to return status information from the controller 400 regarding these commands. This status information is used by the System Operation controller 412 in the central processor 410 to set a condition code 418 used to indicate the status of the System Operation request. The response information may be set from a plurality of sources within the controller 400, including the system serialization controls 402. A central processor 410 can also use this interface to sense the state of the system serialization controls 402 in system controller 400.

A further interface includes interface 422, which provides the conventional quiesce state (I-AM-QUIESCED) 420 of this local central processor 410 to the system controller 400. The system controller 400 ANDs 404 the I-AM-QUIESCED state 420 from all the applicable processors in the system to indicate the system-is-quiesced state 406. This system-is-quiesced state 406 is provided across interface 434 to each central processor 410 where a local copy 424 is maintained. In addition, a new local HOLD-QUSYS latch 428 in each processor allows the local processor to maintain or hold the value of system-is-quiesced 424. The QUSYS latch 426 indicates the system has quiesced for this conventional quiesce sequence. QUSYS 426 is set when system-is-quiesced 424 is on and is reset when HOLD-QUSYS 428 is OFF. In other words, QUSYS 426, once ON will not be reset even if the system-is-quiesced 424 state goes to zero as long as HOLD-QUSYS is ON 428.

For quiesce operations such as IPTE, IDTE, SSKE and CSP(G), when required, a fast-quiesce operation is sent across the System Operation interface 414. If the system serialization controller 402 is busy processing another fast-quiesce request, it will indicate this "reject" to the system operation controller 412 in the initiating central processor 410 using the condition code 418. Firmware in the initiating central processor maintains a count of the number of rejects for any given fast-quiesce request 430. When this count reaches the fast-quiesce reject limit 432, a conventional quiesce sequence (described in more detail below) is used to guarantee the fast-quiesce does eventually complete.

If the system serialization controller 402 is not busy with another fast-quiesce operation, i.e., the command is not rejected, it will broadcast across interface 438 the fast-quiesce "control" command to the Quiesce Controller 436 in each central processor 410 of the system. When the Quiesce Controller 436 receives a fast-quiesce (FQui) request, it will determine if that central processor 410 must be interrupted to handle that quiesce request and if so it will indicate this 443 to the Quiesce Interruption Controller 440 causing a fast-quiesce request 442 and interruption 444 to become pending (see FIG. 4B). In addition, and when appropriate, the quiesce controller 436 will forward the fast-quiesce command to the Translation Look-aside Buffers (or TLBs) 446 in the central processor 410 so that it can invalidate any TLB entries required by the request.

When a conventional quiesce sequence is used, either because of multiple fast-quiesce rejects or because the fast-quiesce mechanism does not support the function requiring the quiesce, the firmware sends either a full or an early-release conventional quiesce "control" command across interface 414 using the System Operation controller 412. For either request, the System Serialization Controller 402 forwards the SYSOP command, which indicates that a conventional quiesce is requested, to the Quiesce Controller 436 in each processor. The Quiesce Controller uses the initiator's processor ID 324 or 334 from the SYSOP request to set the corresponding bit in the PU conventional quiesce priority vector 450. The conventional quiesce priority vector 450 is used, among other things, to determine if this local processor has conventional quiesce priority based on the processor ID of the local processor 452. If the bit corresponding to the local PUID 452 is the left-most bit that is on in the priority vector 450 then this processor is given conventional quiesce priority 454.

The logical OR 456 of the bits in the quiesce priority vector 450 is used to indicate if there is any conventional quiesce (CQui) request pending 458. This is provided to firmware as a branch condition. In addition, the any-conventional-quiesce-request-pending indicator 458 is sent to the Quiesce Interruption Controller 440. The details of the Quiesce Interruption Controller 440 and the associated interruption conditions are depicted in FIG. 4B. The necessary SYSOP information is sent from the Quiesce Controller 436 to the Quiesce Interruption Controller 440 on interface 471. In the Quiesce Interruption Controller 440, there is a block-conventional-quiesce-interruption latch 460 which is set by firmware when it has been determined that this processor can be released early from a conventional quiesce interruption and therefore the corresponding conventional quiesce interruption should not remain pending in the hardware. The block-conventional-quiesce-interruption latch 460 is reset by hardware when any-conventional-quiesce-request pending 458 goes to zero indicating that the current conventional quiesce sequence has completed. Only if the any-conventional-quiesce-request-pending indication 458 is ON and the block-conventional-quiesce-interruption latch 460 is OFF is the conventional-quiesce-interruption-pending latch 462 set.

When a full conventional quiesce SYSOP is received by the Quiesce Controller 436, as indicated in the SYSOP command 320, this is sent on interface 471 to the Quiesce Interruption Controller 440 and the full-conventional-quiesce-request-pending latch 464 is set. If this latch is ON and the block-conventional-quiesce-interruption latch is OFF then the full-quiesce-interruption-pending latch 466 is set. When an early-release conventional quiesce SYSOP, as indicated in the SYSOP command 330, is received by the Quiesce Controller 436 and the current zone 468 for the partition applicable to this local processor is equal to the initiating zone 334 from the SYSOP request on interface 471, the zone-conventional-quiesce-request-pending latch 470 is set. If the zone-conventional-quiesce-request-pending indication 470 is ON and the block-conventional-quiesce-interruption latch 460 is OFF the zone-conventional-quiesce-interruption-pending latch 472 is set. Both the full-conventional-quiesce-request-pending latch and the zone-conventional-quiesce-request-pending latch are reset when any—conventional-quiesce-request-pending 458 goes to zero. A description of the circumstances under which the full and the early-release conventional quiesce requests are used is provided below. Note that, with the addition of the block-conventional-quiesce-interruption latch, it is possible for a conventional quiesce request to be pending in the processor when the corresponding conventional quiesce interruption is not.

As noted herein, the above described computing environment is one example only. Many variations are possible without departing from the spirit of the present invention. For example, one or more partitions can be running in different architecture modes. Further, as another example, the environment need not be based on the z/Architecture®, but instead, can be based on other architectures offered by Intel, Sun Microsystems, as well as others.

Figure 5A:
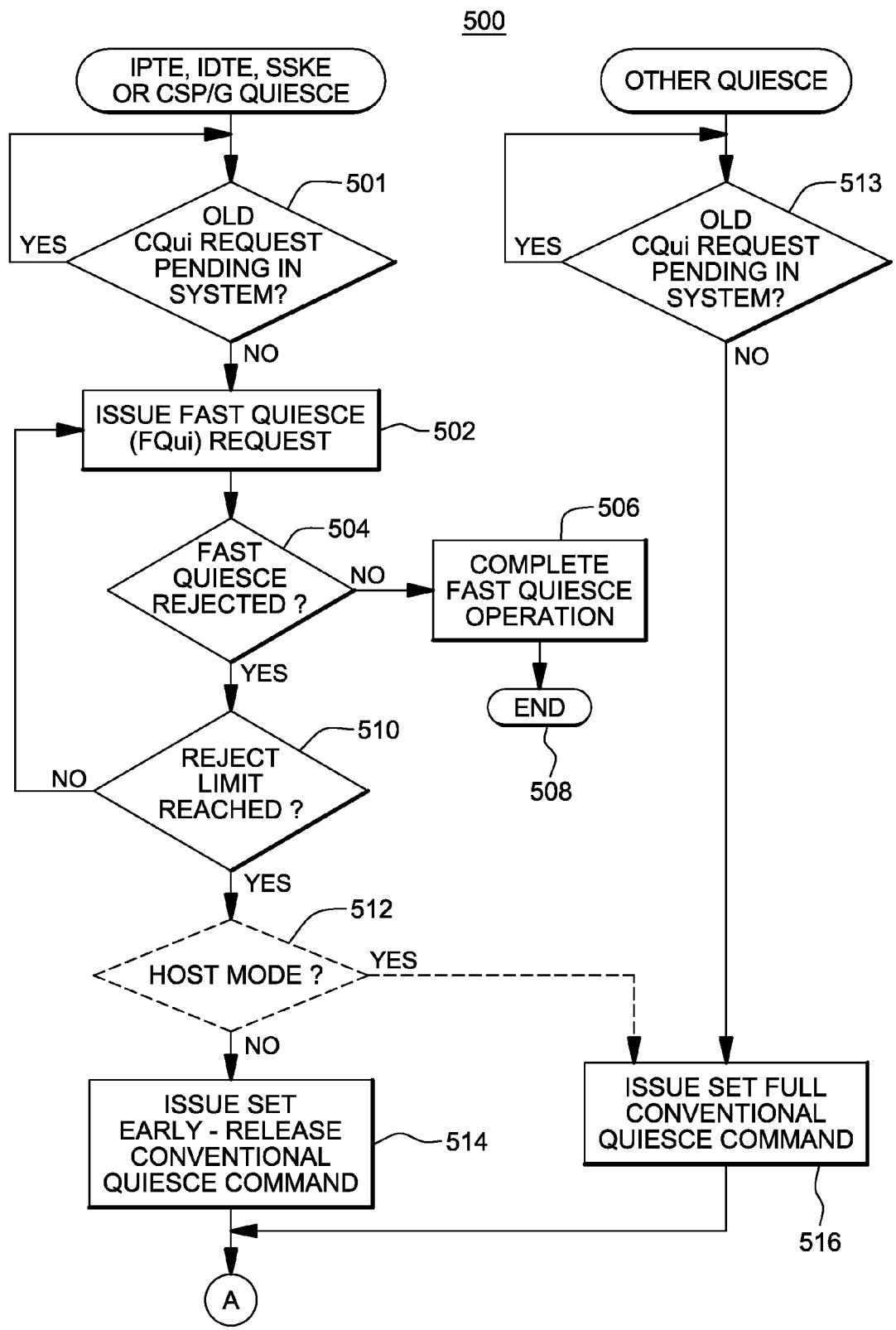
FIGS. 5A-5C depict one embodiment of quiesce request processing at a request initiating processor of the computer system of FIGS. 4A & 4B, in accordance with an aspect of the present invention.
Figure 5B:
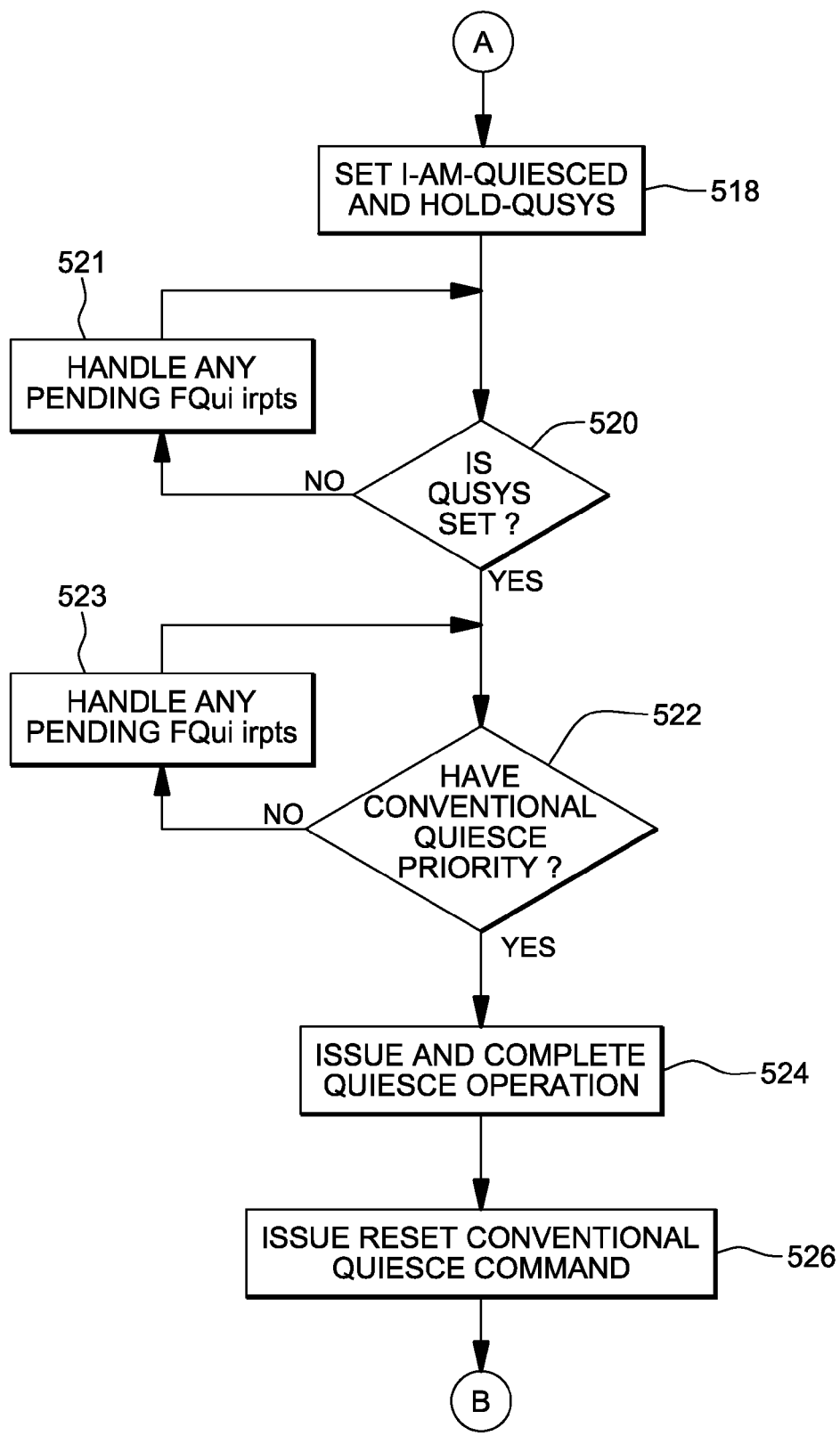
Figure 5C:
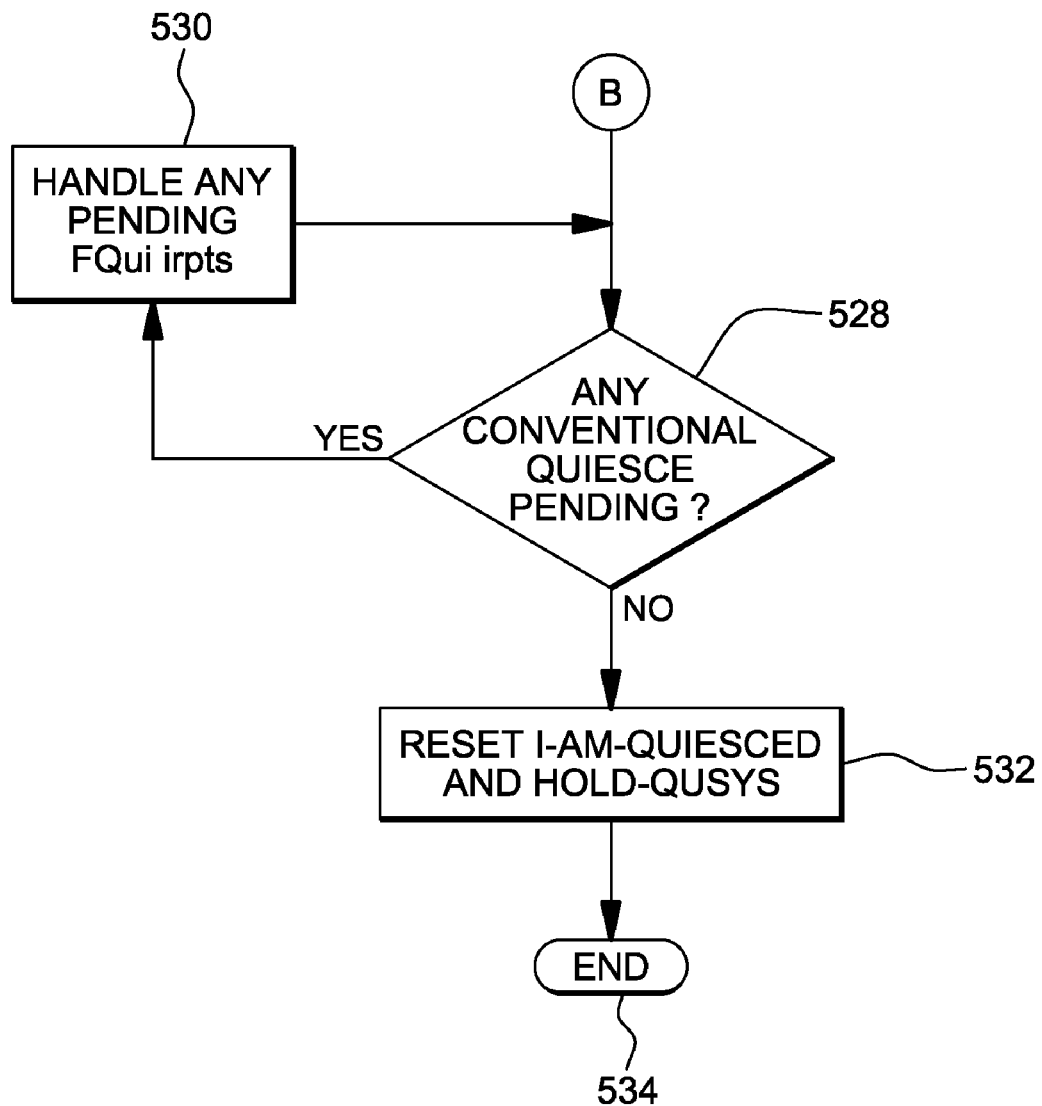

One possible process implementation for the quiesce initiator (i.e., the processor initiating a quiesce request) is depicted in FIGS. 5A-5C. The processing 500 of FIGS. 5A-5C begins with the quiesce initiator firmware, when invoked, waiting until there are no old conventional quiesce (CQui) request pending in the system, 501 and 513. The local processor can determine that an old conventional quiesce request is still pending when the any-conventional-quiesce-request-pending latch (458 in FIG. 4A) is ON but the conventional-quiesce-interruption-pending latch (462 in FIG. 4B) is OFF. (An old conventional quiesce request will still be pending if this processor participated in an early-release request which is still not complete in the old initiator(s).) If the new quiesce initiator is executing an operation not supported by fast-quiesce, that is any operation besides IPTE, IDTE, SSKE or CSP(G), then after any old conventional quiesce requests are complete 513, the firmware issues a full conventional quiesce request or command 516. If, however, the quiesce request is being made by IPTE, IDTE, SSKE or CSP(G), once any old conventional quiesce requests are complete 501, it executes a fast-quiesce (FQui) request 502. If the fast-quiesce resources in the system controller are busy with another fast-quiesce request, it is indicated to the initiator in the condition code (418 in FIG. 4A) as a reject. The initiator queries if the request was rejected 504, and if the request was not rejected, then it completes the fast-quiesce 506 and ends the operation 508. If the fast-quiesce request was rejected 504, then the initiator compares the number of rejects (430 in FIG. 4A) with a reject limit (432 in FIG. 4A) 510. If the reject limit has not been reached, then the fast-quiesce request is reissued 502 and the processing continues as before. If the reject limit has been reached 510, then the processor uses the conventional quiesce mechanism to guarantee that the fast-quiesce request can complete. Optionally, if the processor is running in host mode 512, that is, if it is executing hypervisor code, then firmware will issue a Full Set Conventional Quiesce request 516. The full conventional quiesce reverts to the implementation where all processors in the system must respond to the request and remain quiesced until the initiator has completed its operation. However, if the initiating processor in not running in host mode 512 then it will issue an Early-release Set Conventional Quiesce request or command 514. This allows for the receiving processors to remain quiesced for a shorter time as described below in connection with FIGS. 6A & 6B.

Continuing with the processing of FIG. 5B, once the quiesce initiator has sent the Set Conventional Quiesce command, it then sets I-AM-QUIESCED (420 in FIG. 4A) and HOLD-QUSYS (428 in FIG. 4A) 518 and waits for all the processors in the system to do the same, that is it waits for the system to be quiesced, i.e., QUSYS (426 in FIG. 4A) 520. The millicode uses the local QUSYS (426 in FIG. 4A) latch rather than the system-is-quiesced (424 in FIG. 4A) in case a receiving processor has already dropped its I-AM-QUIESCED, causing system-is-quiesced (406 and 424 in FIG. 4A) to drop, in response to an early-release request. Since HOLD-QUSYS is set at the same time as I-AM-QUIESCED it ensures that the processor detects the system was quiesced in response to this convention quiesce sequence even if another processor is no longer in the quiesce receiver code. While waiting for QUSYS to be set 520, any applicable fast-quiesce requests that are received from another processor that has not yet quiesced 521, may be handled.

Once the system is quiesced, each initiating processor takes its turn, i.e., waits until it has conventional quiesce priority 522 before performing the quiesce operation 524. In the case of IPTE, IDTE, SSKE and CSP(G), this includes issuing a fast-quiesce request. The logic used to determine quiesce priority is depicted in FIG. 4A in 450, 452 and 454. This mechanism guarantees that each processor will be able to complete its fast-quiesce request without being rejected. While waiting for quiesce priority 522, any fast-quiesce requests that are received from another processor that has received conventional quiesce priority, may be handled 523. As each processor receives priority 522 and completes its operation 524, it will, in turn, issue a Reset Conventional Quiesce command 526. Referring to FIG. 5C, it then waits until all the initiators have reset their request, i.e., no conventional quiesce interrupts are pending in the system 528 (see FIG. 5C). While waiting for all conventional quiesce interrupts to drop 528, any applicable fast-quiesce requests that are received from another processor that has received conventional quiesce priority 530, may be handled. Once there are no further conventional quiesce interrupts pending, it resets I-AM-QUIESCED and HOLD-QUSYS 532 and completes the instruction 534.

Figure 6A:
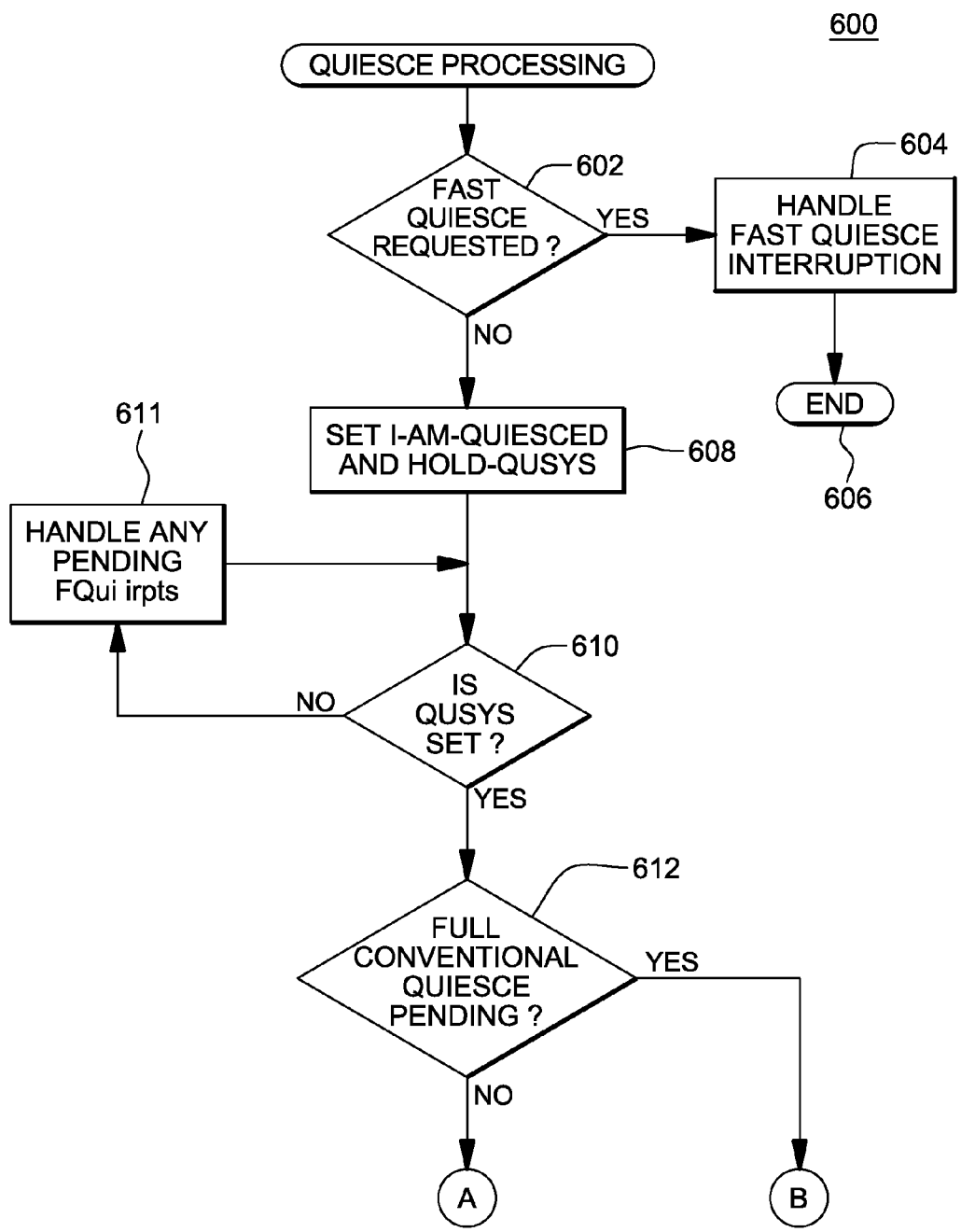
FIGS. 6A & 6B depict one embodiment of quiesce request processing at a request receiving processor of the computer system of FIGS. 4A & 4B, in accordance with an aspect of the present invention.
Figure 6B:
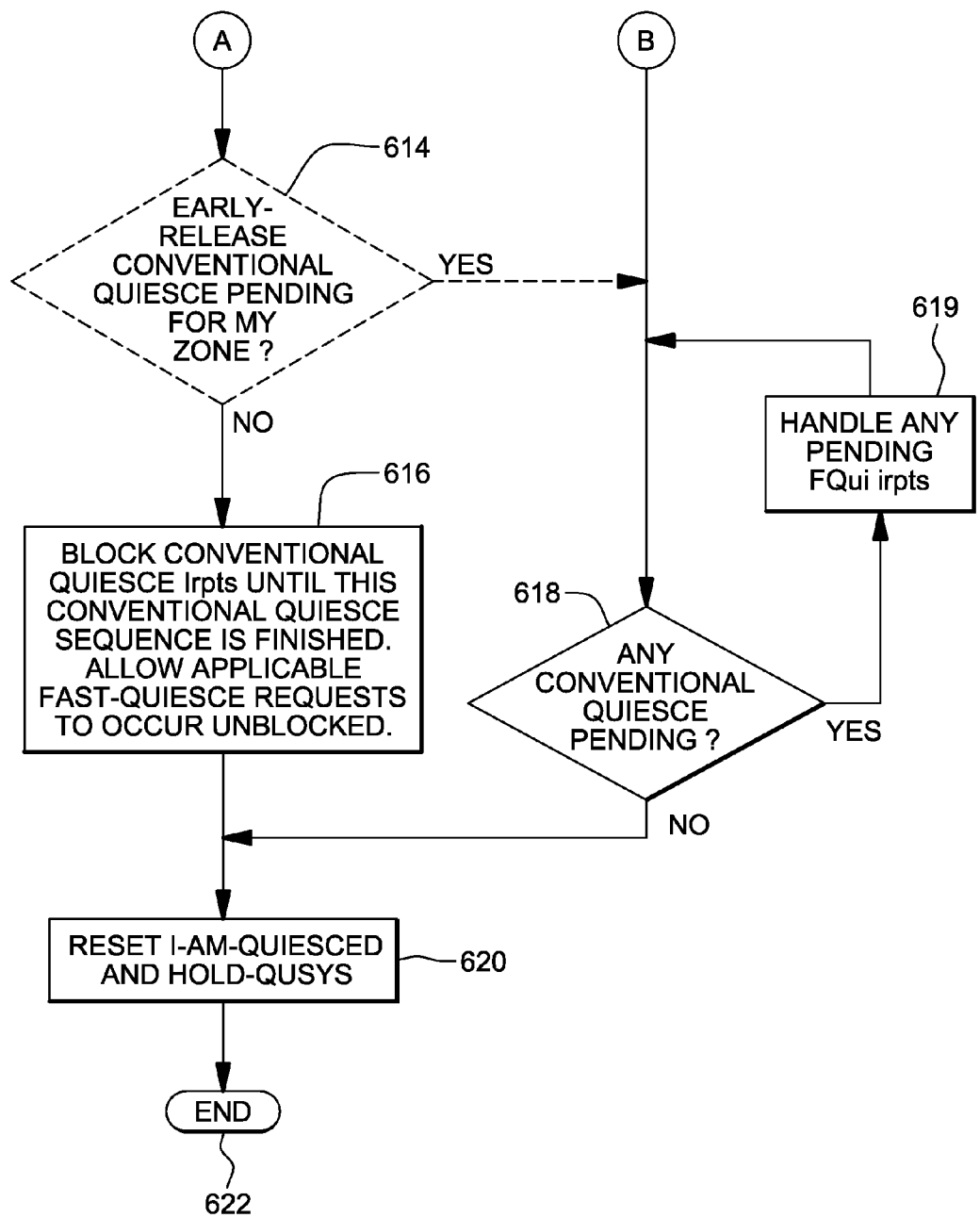

Referring to processing 600 of FIGS. 6A & 6B, the quiesce receiver (i.e., a processor receiving a quiesce request) is notified of a pending quiesce request by a quiesce interrupt request, which causes the quiesce receiver firmware to be invoked. In one embodiment, the quiesce receiver firmware performs processing 600 of FIGS. 6A & 6B. The receiver first determines if the quiesce interruption was for a fast-quiesce request (444 in FIG. 4B) 602 and if it was then it will handle the request appropriately 604 and end 606. Otherwise, the request is a conventional quiesce request and the receiver responds to the request by setting I-AM-QUIESCED (420 in FIG. 4A) and HOLD-QUSYS (428 in FIG. 4A) 608. This lets the system controller (400 in FIG. 4A) know that it is quiesced. After each receiving processor sets its own I-AM-QUIESCED 608, it waits for the entire system to become quiesced 610. For the same reasons as apply to the initiator, i.e., to make sure it sees the system quiesce even if another of the receivers has already reset I-AM-QUIESCED (420 in FIG. 4B), the receivers use QUSYS (426 in FIG. 4B) instead of system-is-quiesced (424 in FIG. 4B). While waiting for QUSYS to be reset 610, any applicable fast-quiesce requests that are received from another processor that is not yet quiesced, may be handled 611.

Once the system is quiesced, all processors are either in quiesce receiver code or have sent their conventional quiesce requests, and thus, no new conventional quiesce requests can be received. At this point a check is made to see if any full conventional quiesce interruptions are pending (466 in FIG. 4B) 612. If there is a full request pending then it is handled, and the processor remains in quiesce receiver code until all conventional quiesce requests (462 in FIG. 4B) have been reset 618. Responsive to this, the processor's I-AM-QUIESCED (420 in FIG. 4A) and HOLD-QUSYS (428 in FIG. 4A) 620 indicators are reset and the instruction is completed 622. If, however, there is no full conventional interrupting pending (466 in FIG. 4B) 612 then a check is made to see if a quiesce is pending for the zone this processor is currently running in (472 in FIG. 4B) 614 (FIG. 6B) and if so, then processing waits for all conventional quiesce interruptions to drop 618. While waiting for all conventional quiesce interruptions to drop 618, any applicable fast-quiesce requests that are received from another processor that has received conventional quiesce priority, may be handled 619. Once there are no further conventional quiesce interrupts pending, the processor resets I-AM-QUIESCED and HOLD-QUSYS 620 and completes the instruction 622. If, however, there is no full conventional quiesce pending 612 (FIG. 6A) and no zone-based conventional pending for the current zone 614 (FIG. 6B) then there is no need to wait for the conventional quiesce requests to drop, and processing can indicate that the conventional quiesce interruptions should be blocked, i.e., block-conventional-quiesce-interruption 460 in FIG. 4B, 616. This does not block fast-quiesce requests. Rather, they continue to be processed as normally done. This indicates that the quiesce interruption handler should not be invoked for conventional quiesce until this conventional quiesce sequence is complete. The I-AM-QUIESCED and HOLD-QUSYS 620 indicators can then be reset and the instruction can be completed 622.

An improved implementation of the early-release conventional quiesce mechanism further exploits the fact that the purpose of the conventional quiesce in the case of IPTE, IDTE, SSKE and CSP(G) is to serialize the fast-quiesce requests among the initiators in order to guarantee that they have access to the fast-quiesce resources in the system. It also relies on the fact that the fast-quiesce mechanism, which is used by the initiator even when the fast-quiesce request is being issued under a conventional quiesce, provides all the necessary serialization in the receivers of the requests.

There are two enhancements which can be made to the initiator firmware described above in connection with FIGS. 5A & 5B. The first involves the increased use of the early-release conventional quiesce requests in the case of IPTE, IDTE, SSKE and CSP(G). In the implementation for these instructions in FIGS. 5A & 5B, the initiator would not use the early-release conventional quiesce request in host mode (represented by 512 and 516 in FIG. 5A). This is due to the fact that the described implementation, the receiver used the initiating zone number to determine if the incoming quiesce request was associated with the zone or partition currently applicable to this processor. In an alternative implementation, IPTE, IDTE, SSKE and CSP(G) quiesce requests will always use the early-release conventional quiesce mechanism even in host mode.

Figure 7:
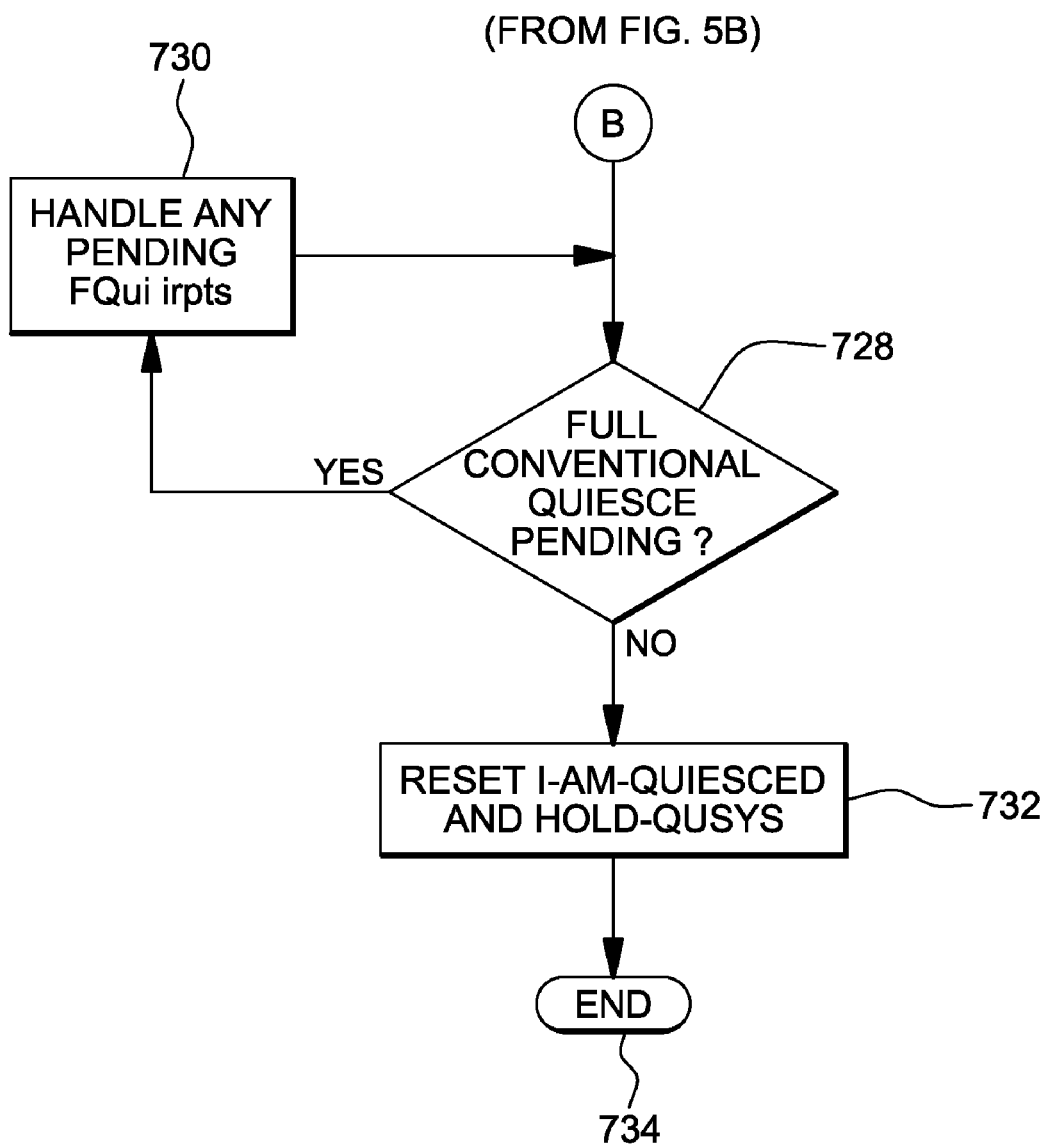
FIG. 7 depicts an alternative embodiment to the quiesce request processing of FIG. 5C at a request initiating processor, in accordance with an aspect of the present invention.

The second change to the initiator firmware applies when this initiating processor is actually serving as receiver instead of initiator. In the implementation of FIGS. 5A-5C, there are two places in the initiator code where the processor is playing a conventional quiesce receiver role: 1) when the initiator code is waiting for quiesce priority 522 and 2) after it has received priority 522, executed its fast-quiesce operation 524, reset its conventional quiesce request 526 and is waiting for the remaining pending conventional quiesce requests to complete 528. In the later case, the initiator has completed its operation and, since it is now acting as the receiver, it only needs to remain quiesced if there is a full conventional quiesce pending 728 (FIG. 7). Thus, in an alternate implementation, the initiator waits for all pending FULL conventional quiesce requests to drop 728 (FIG. 7), and while waiting, any applicable fast-quiesce requests that are received may be handled 730. Otherwise, it resets I-AM-QUIESCED and HOLD-QUSYS 732 and ends 734 without waiting. That is, if no full conventional quiesce request was included in the pending quiesce request sequence (i.e., only early-release conventional requests are within the sequence), the initiator can complete execution of its instruction without waiting for any remaining initiator to complete its instruction.

Figure 8:
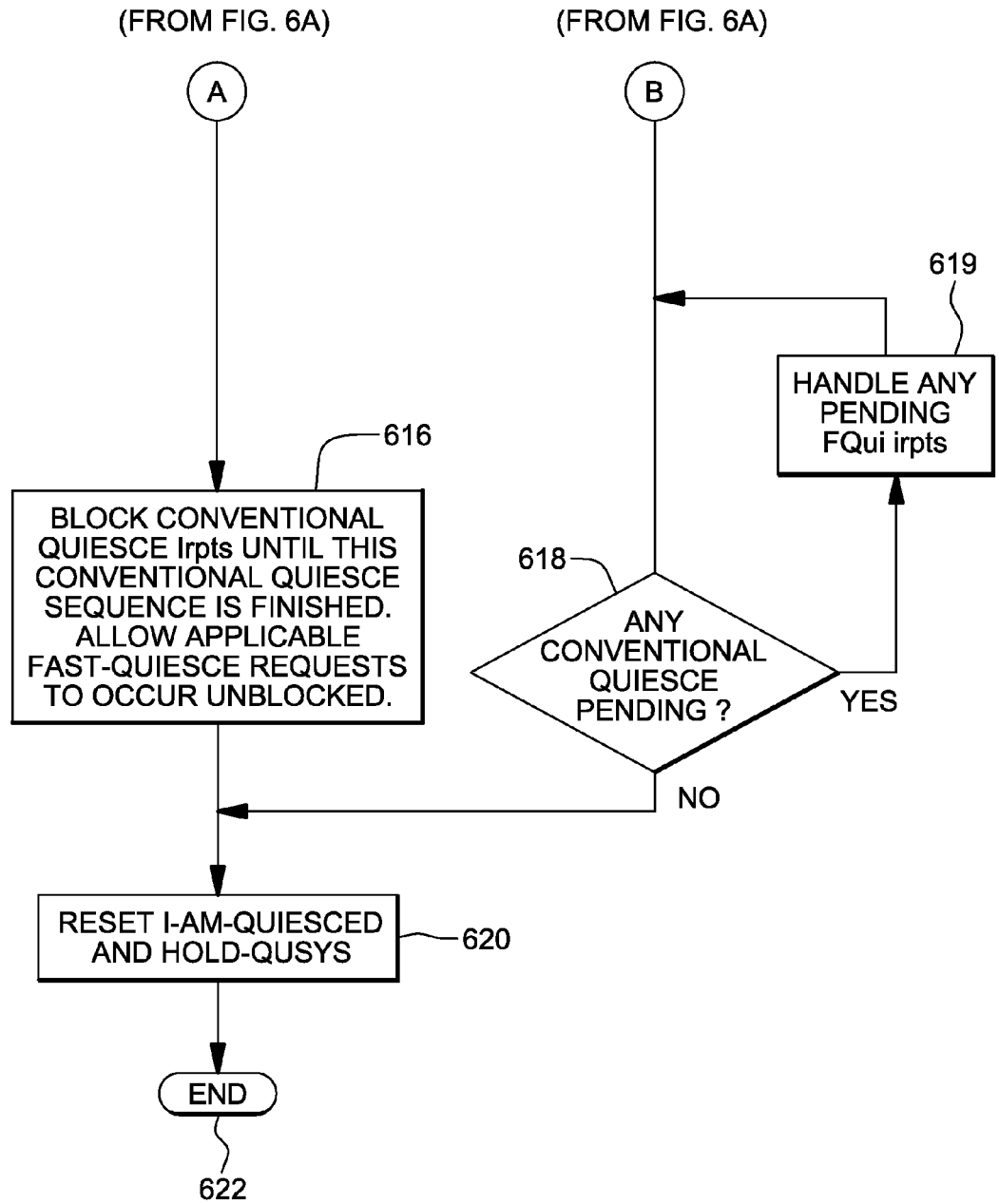
FIG. 8 depicts an alternate embodiment to the quiesce request processing of FIG. 6B at a request receiving processor, in accordance with an aspect of the present invention.

The receiver code of FIGS. 6A & 6B can be improved by relying on the fast-quiesce serialization for IPTE, IDTE, SSKE and CSP(G). In the example of FIGS. 6A & 6B, the receiver remains in the quiesce interruption for the duration of the quiesce operation 618 if the early-release conventional quiesce request was for the current zone 614. This is done since the conventional quiesce request pertained to the zone that was currently active on this processor. This is not necessary since the fast-quiesce request is being used under a conventional quiesce for IPTE, IDTE, SSKE and CSP(G), such that the only purpose for the conventional quiesce is to serialize the initiators. From a receiver perspective, no additional serialization is needed. As a result, as illustrated in FIG. 8, if no full conventional quiesce interruption is pending 612, regardless of the initiating zone, conventional quiesce interrupts from this pending quiesce request sequence can be blocked 616, the I-AM-QUIESCED and HOLD-QUSYS 620 indicators can be reset and queiesced state ended 622 without waiting for all conventional quiesce requests to drop.

Figure 9:
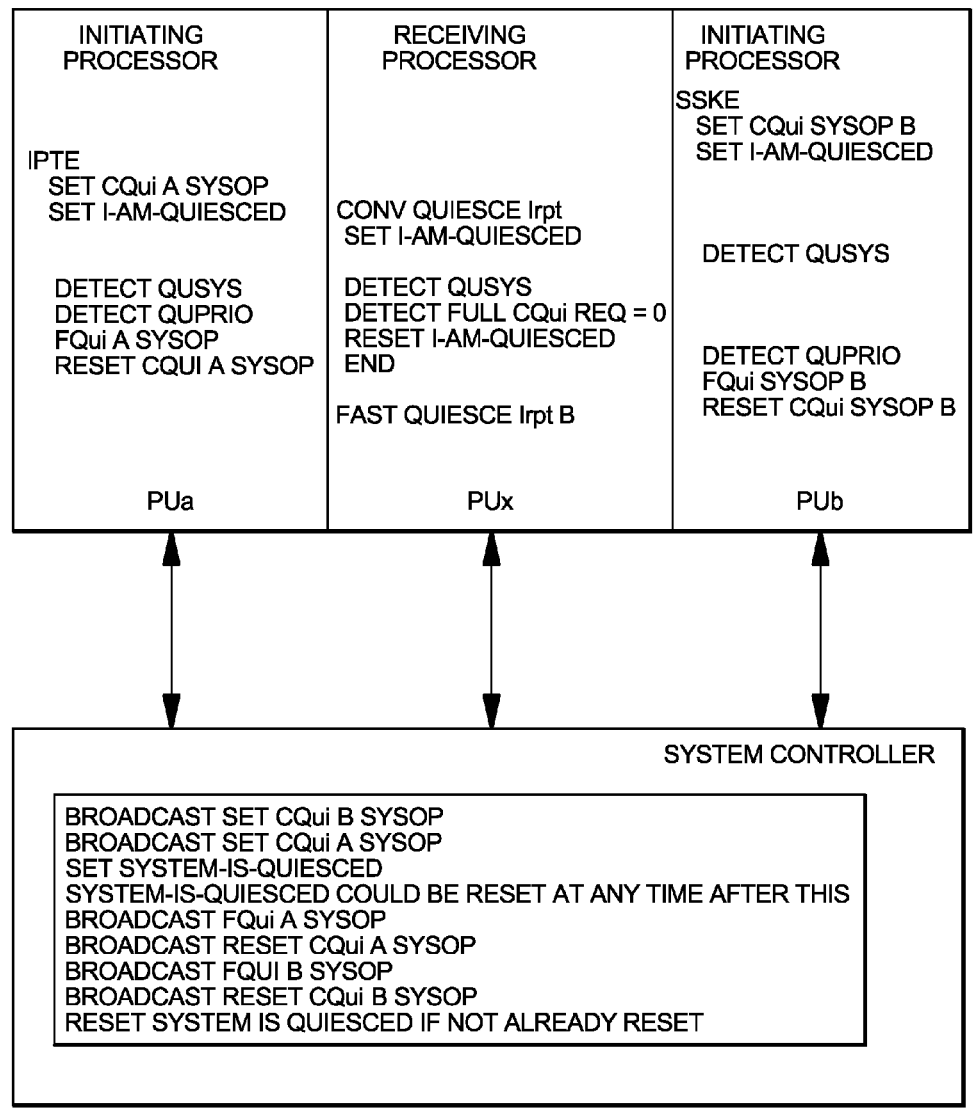
FIG. 9 depicts one example of quiesce request processing, in accordance with an aspect of the present invention.

FIG. 9 depicts an IPTE operation being initiated on multiple processors, with other processors being the receivers. In this example, PUb is executing an SSKE instruction which requires a conventional quiesce. It issues a Set Early-release Conventional Quiesce SYSOP (CQuiB) command to the system controller and then sets I-AM-QUIESCED and HOLD-QUSYS. PUa, which is executing a conventional quiesce IPTE, shortly after, issues another Set-Early-release Conventional Quiesce command (CQuiA) and sets I-AM-QUIESCED and HOLD-QUSYS. The System Controller receives the CQuiB command and forwards it to all the processors in the system and once it receives the CQuiA command it forwards that, as well.

When each of the processors (PUa, PUb, or PUx) receives the conventional quiesce request, it will set the corresponding bit in the conventional quiesce request vector—first the bit corresponding to PUb and then the one corresponding to PUa. This causes a conventional quiesce interruption to become pending in the hardware and, at an interruptible point, PUx (as an example of a receiving processor) will enter the quiesce interruption millicode routine. Depending on the amount of time it takes to arrive at an interruptible point, PUx may receive the CQuiA command before or after entering the quiesce interruption routine. Once entering the routine, it will also set I-AM-QUIESCED and HOLD-QUSYS. PUa and PUb are in the quiesce initiator code, have already set I-AM-QUIESCED and HOLD-QUSYS and do not need to enter the quiesce interruption routine.

When the system controller detects that all the processors in the system have set I-AM-QUIESCED, it will indicate to all of the processors that the system is quiesced. This is used to set the QUSYS latch and branchpoint in each local processor. Once receiver PUx sees that QUSYS is ON, it will check to see if a full conventional quiesce is pending and, if it is not, it will turn OFF I-AM-QUIESCED and HOLD-QUSYS. The conventional quiesce mechanism is a system-level function whose state, although controlled by the system controller, is partially (quiesce priority vector, for example) maintained local to each processor. The HOLD-QUSYS latch was added to compensate for the fact that 1) some of the quiesce control is local to each processor, 2) on a multi-node system there may be different timing delays on different nodes which can cause the quiesce commands and signals from the system controller to arrive at different times to different processors, particularly when those processors reside on different nodes, and 3) each processor has unique delays due to local cache, out-of-order and similar variables. Once the QUSYS latch is set by the system-is-quiesced line, the HOLD-QUSYS latch guarantees that it will remain set until this processor has detected it. This is to address the case where, for example, receiver PUx detects that QUSYS is ON and turns its I-AM-QUIESCED OFF before another receiver PUy has detected that QUSYS is ON. However, since receiver PUy set hold-QUSYS (at the same time it set I-AM-QUIESCED so we know it was before system-is-quiesced originally came ON), once system-is-quiesced comes ON, QUSYS will remain ON until HOLD-QUSYS is reset. The initiator PUa and PUb have also set HOLD-QUSYS to address the same window.

PUa and PUb, after detecting QUSYS, will wait until they get quiesce priority. In this example, although the system controller received the CQuiB command from PUb before it received the CQuiA command from PUa, since PUa has a lower PUID then PUb, it will be granted priority first. Once it receives priority, initiator PUa will send its IPTE fast-quiesce command (FQuiA) to the system controller who will then broadcast it to all processors in the system. Once FQuiA is complete, PUa will issue the Reset Conventional Quiesce request. This allows initiator PUb to receive quiesce priority and send its SSKE fast-quiesce command (FQuiB) to the system controller which broadcasts it to all the processors. In this example, receiver PUx is running in the same zone as PUb and, therefore, handles the fast-quiesce request. Even though receiver PUx exited the early-release conventional quiesce interruption early, it still is required to honor fast-quiesce requests when applicable. It is because of this that PUx was allowed to exit the quiesce interruption routine even though it was running in the same zone as PUb. Once FQuiB is complete, PUb will issue the Reset Conventional Quiesce request and this conventional quiesce sequence is complete.

As noted, the above described computing environments are provided by example only. Many variations are possible without departing from the spirit of the present invention. For example, one or more partitions can be running in different architecture modes. Further, as another example, the environment need not be based on the z/Architecture®, but instead, can be based on other architectures offered by Intel, Sun Microsystems, as well as others.

For further details on the quiescing operation, reference U.S. Patent Publication Nos.: 2009/0217269 A1; 2009/0217264 A1; 2009/0216929 A1; and 2009/0216928 A1, as well as U.S. Pat. Nos.: 7,530,0067 B2; 7,020,761 B2; and 6,996,698 B2. Each of these U.S. Patent Publications and U.S. Letters Patents is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
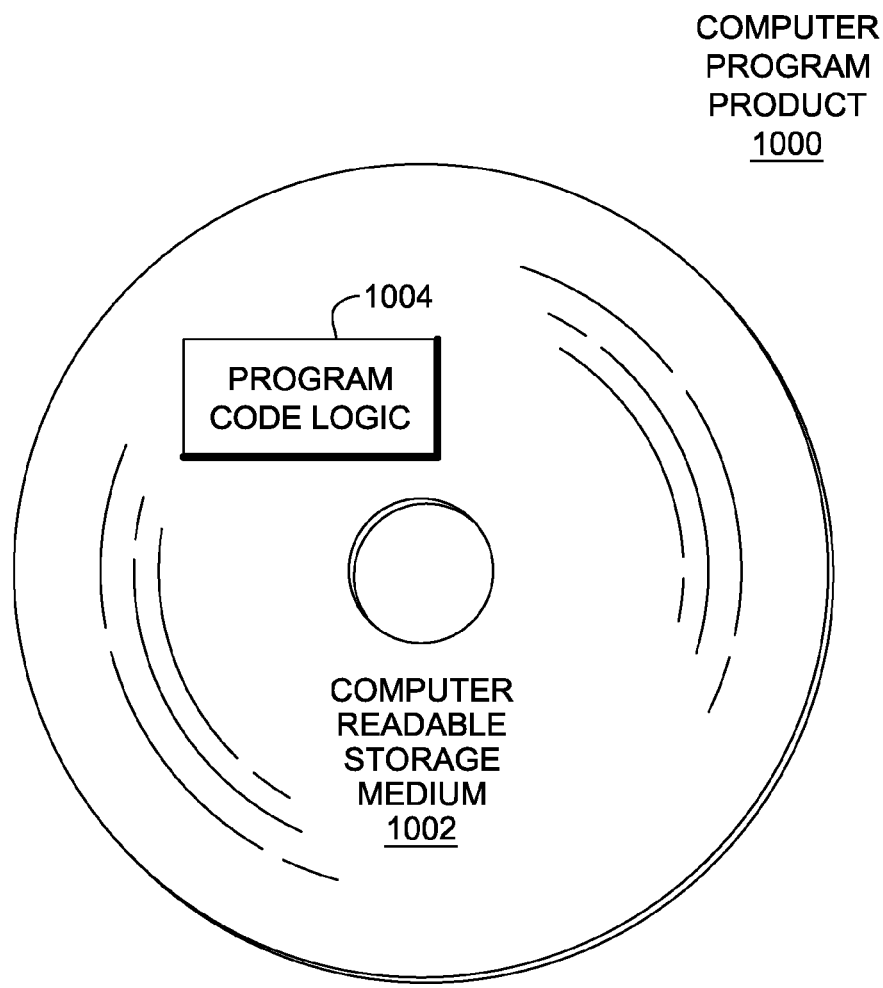
FIG. 10 depicts one embodiment of a computer program product incorporating one or more aspects of the present invention.

Referring now to FIG. 10, in one example, a computer program product 1000 includes, for instance, one or more computer readable storage media 1002 to store computer readable program code means or logic 1004 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Further, although translation tables are described, any data structure can be used and the term table is to include all such data structures. Yet further, although the adapters are PCI based, one or more aspects of the present invention are usable with other adapters or other I/O components. Adapter and PCI adapter are just examples. Moreover, other size address spaces and address tables may be used without departing from the spirit of the present invention. Yet further, other types of addresses may be translated using one or more aspects of the present invention. Even further, other types of translation formats may be used. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
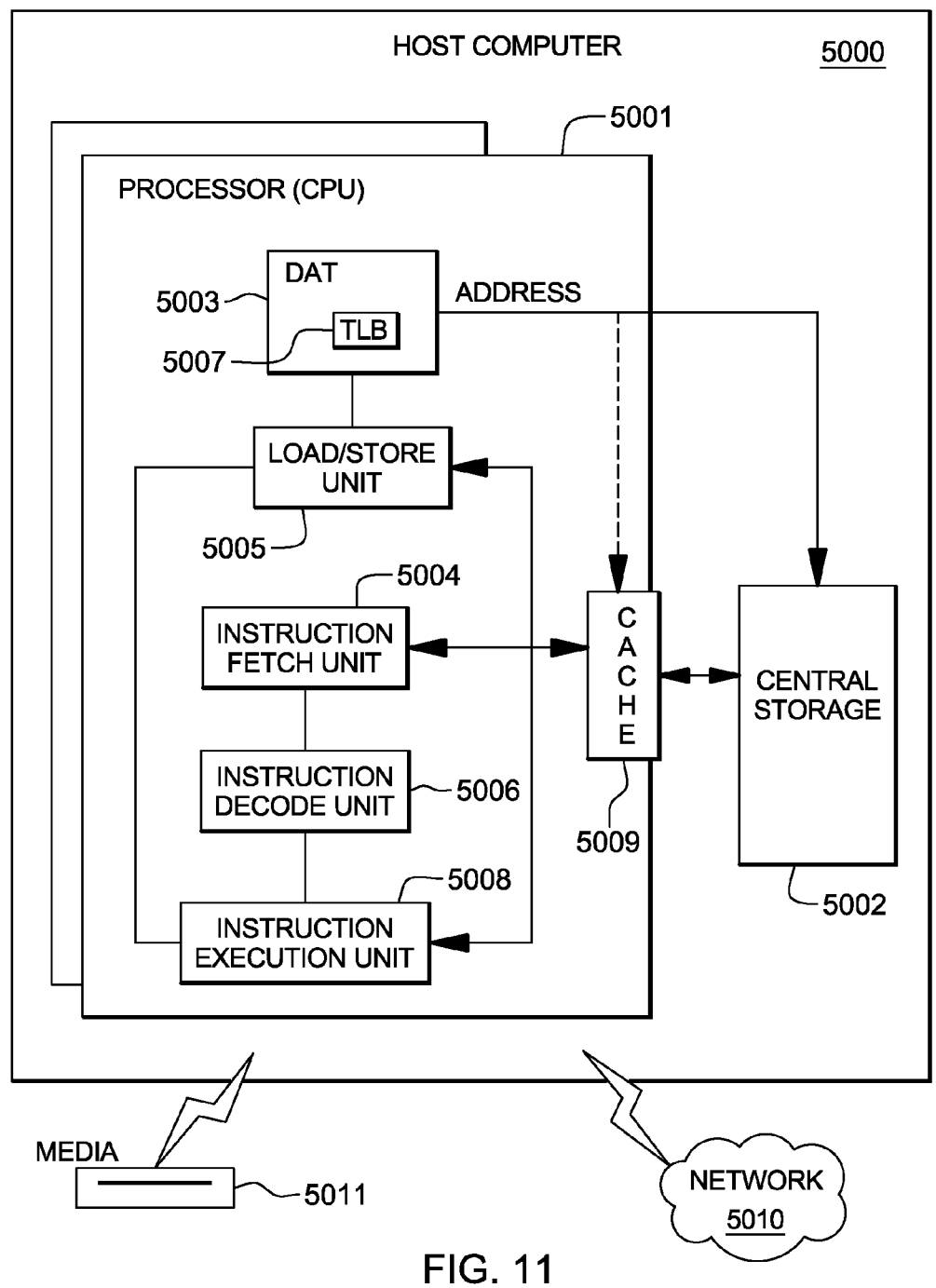
FIG. 11 depicts one embodiment of a host computer system to incorporate and use one or more aspects of the present invention.

Referring to FIG. 11, further details of representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 11, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
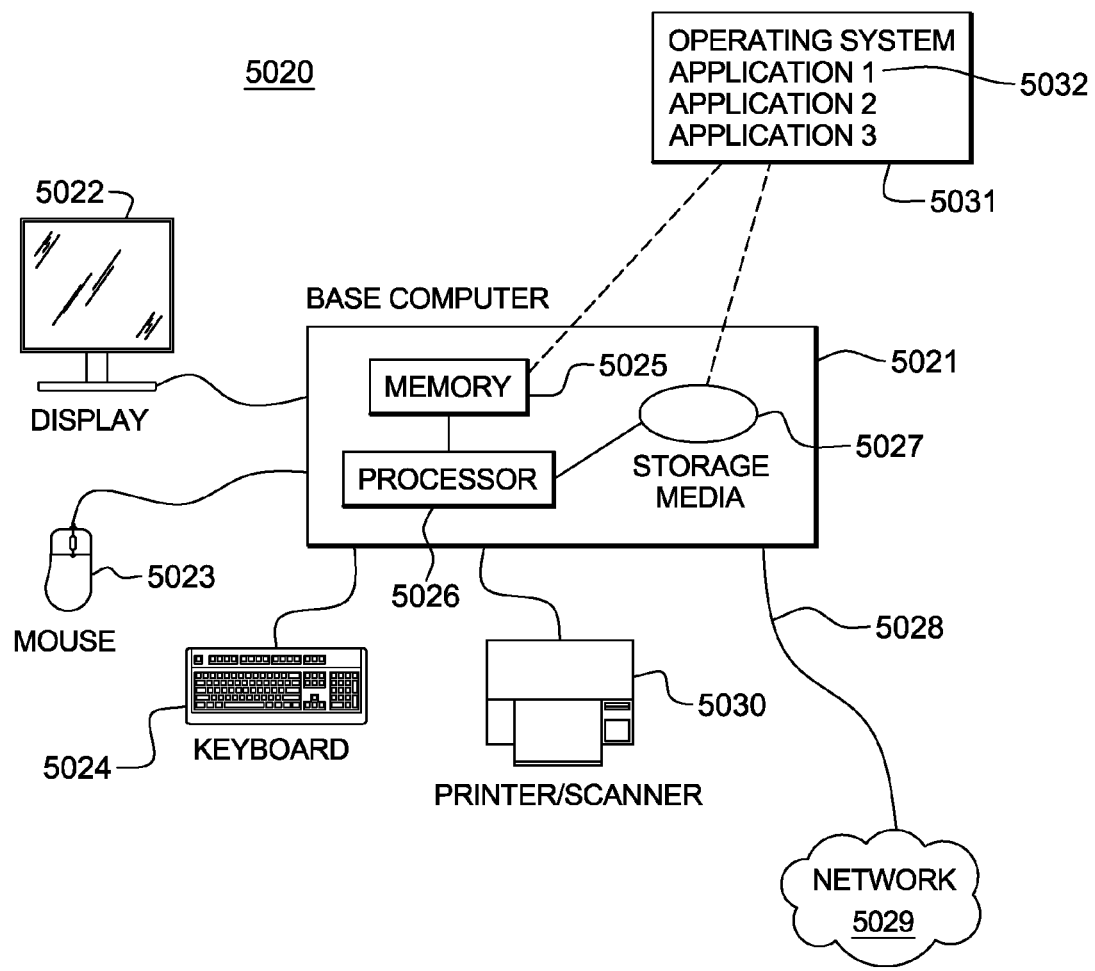
FIG. 12 depicts a further example of a computer system to incorporate and use one or more aspects of the present invention.

FIG. 12 illustrates a representative workstation or server hardware system in which the present invention may be practiced. The system 5020 of FIG. 12 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 13:
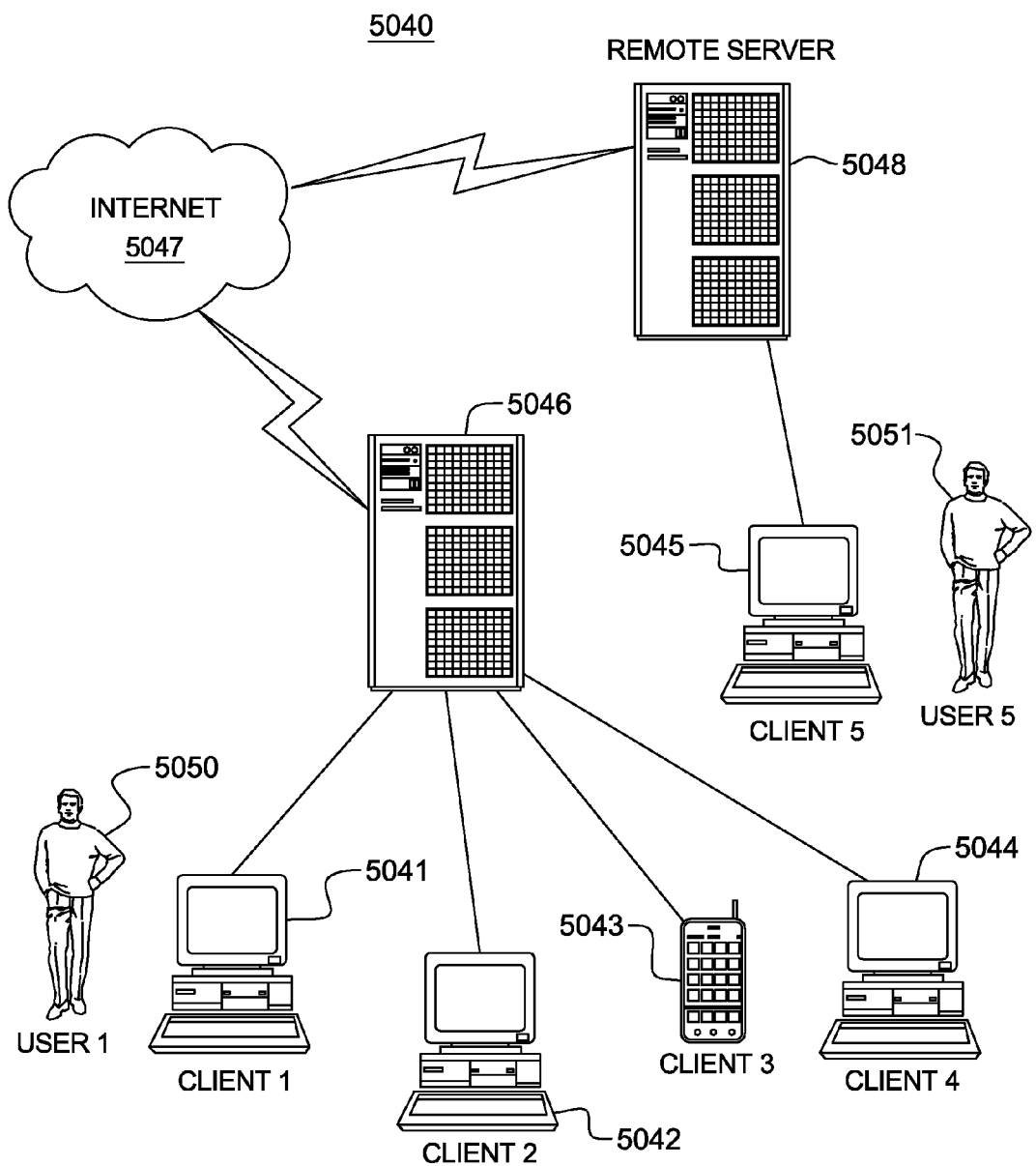
FIG. 13 depicts another example of a computer system comprising a computer network to incorporate and use one or more aspects of the present invention.

FIG. 13 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 12 and FIG. 13, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
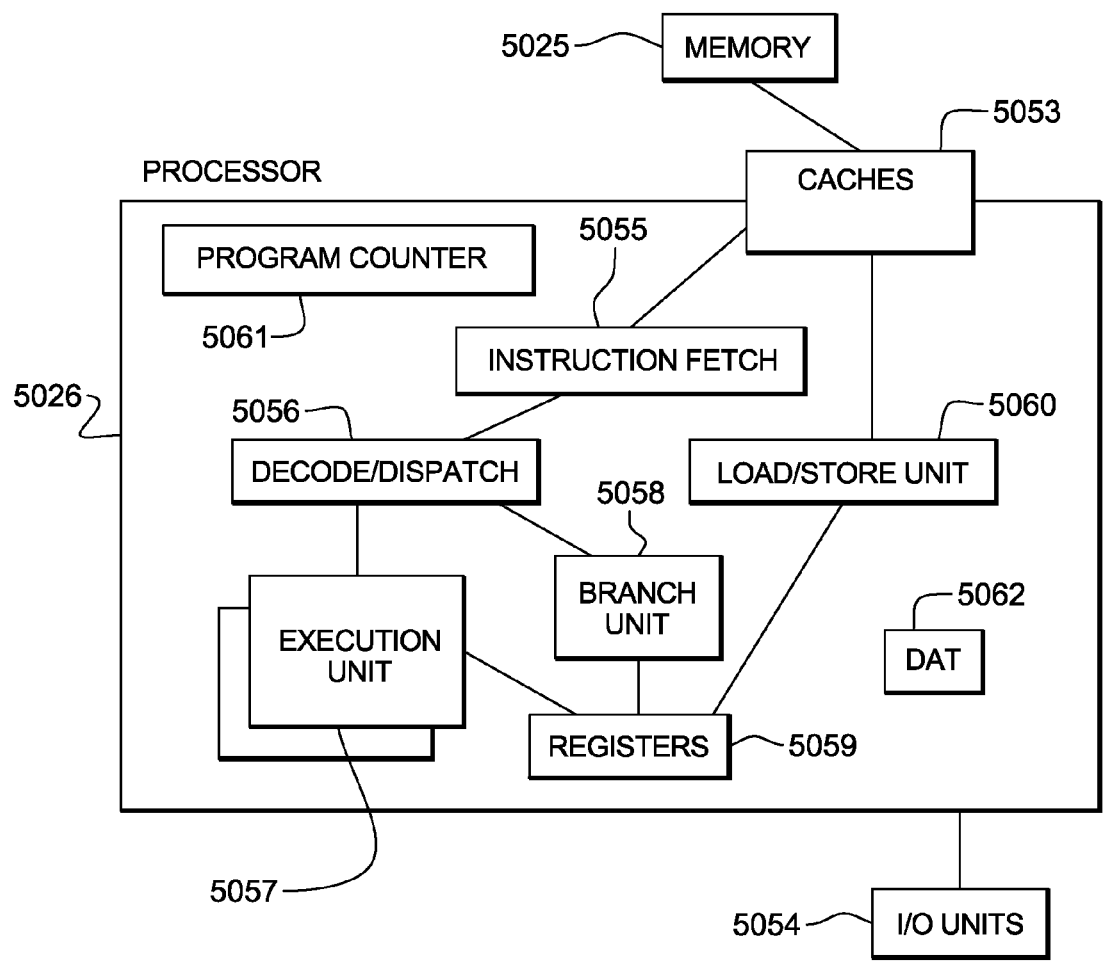
FIG. 14 depicts one embodiment of various elements of a computer system to incorporate and use one or more aspects of the present invention.

Referring to FIG. 14, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 15A:
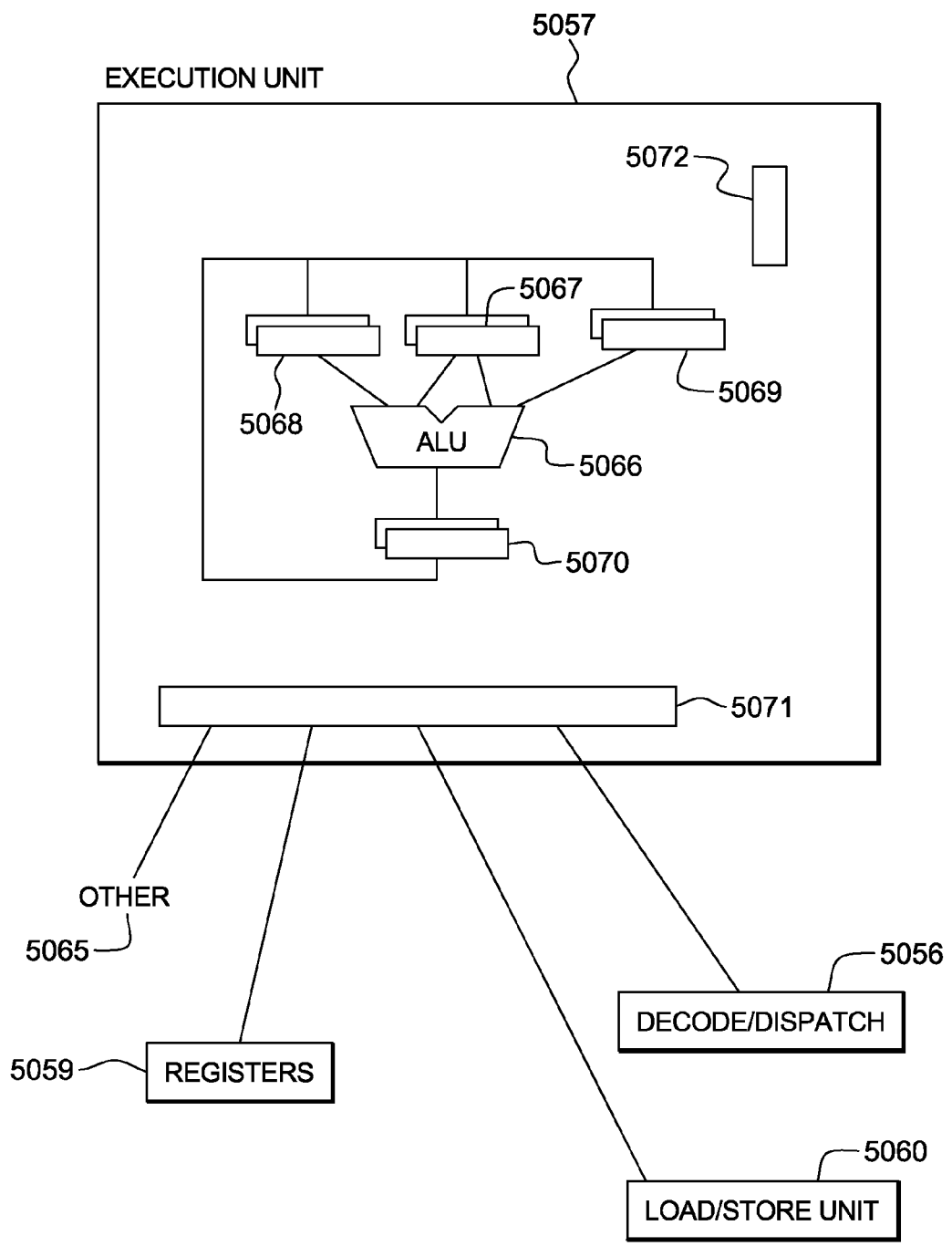
FIG. 15A depicts one embodiment of the execution unit of the computer system of FIG. 14 to incorporate and use one or more aspects of the present invention.

A processor 5026 typically has one or more units 5057, 5058, 5060 for executing the function of the instruction. Referring to FIG. 15A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in short-hand, where a 12 bit field defines an address of a 4,096 byte block and is commonly described as a 4 Kbyte (Kilo-byte) block, for example.

Figure 15B:
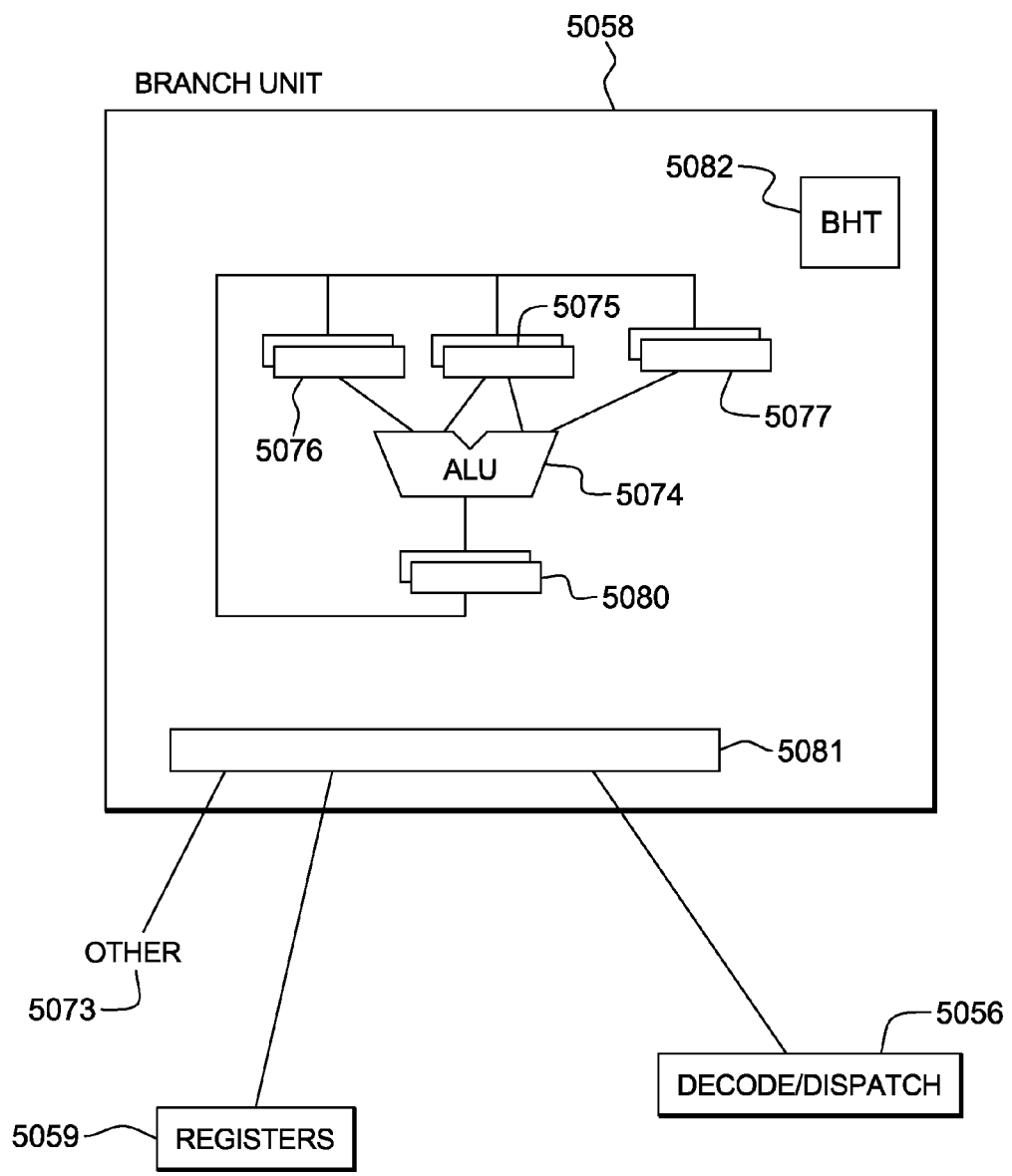
FIG. 15B depicts one embodiment of the branch unit of the computer system of FIG. 14 to incorporate and use one or more aspects of the present invention.

Referring to FIG. 15B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 15C:
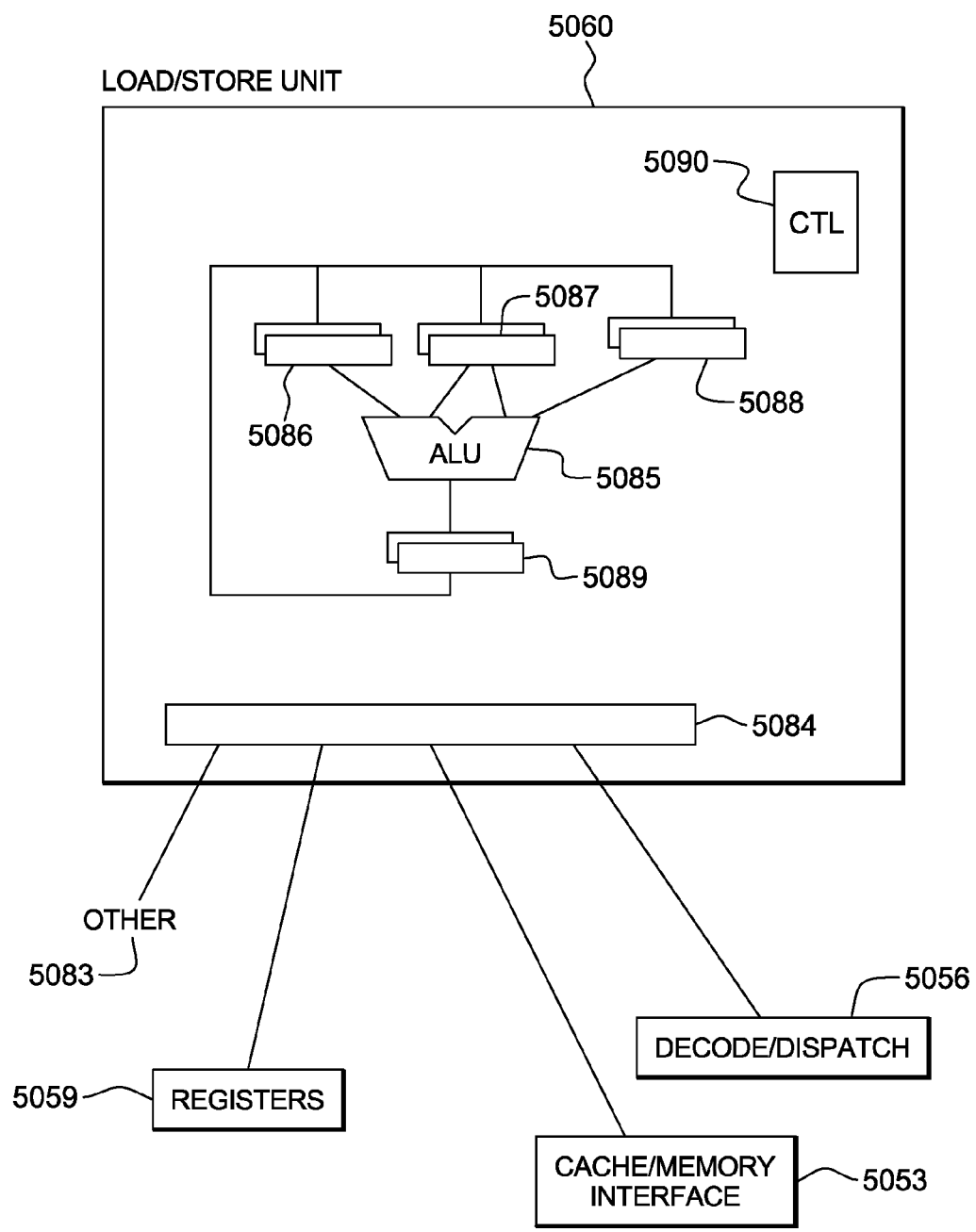
FIG. 15C depicts one embodiment of the load/store unit of the computer system of FIG. 14 to incorporate and use one or more aspects of the present invention.

Referring to FIG. 15C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 14) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for processing quiesce requests of a computer system, the computer program product comprising:
   a computer readable storage medium readable by a processing circuit and storing instructions for executing by the processing circuit for performing a method comprising:
      determining whether a quiesce request received at a processor of the computer system is of a fast-quiesce type, and responsive to the quiesce request being of the fast-quiesce type,
   handling a fast-quiesce type interruption at the processor;
      responsive to the quiesce request being other than of the fast-quiesce type, setting an I-AM-QUIESCED indicator and a HOLD-QUSYS indicator at the processor to, in part, inform a system controller of the computer system that the processor has entered a quiesced state, and determining whether other processors of the computer system have entered the quiesced state; and
      responsive to the other processors of the computer system having entered the quiesced state, determining by the processor whether any total system quiesce requests are pending, and responsive to no total system quiesce request being pending, blocking system quiesce interrupts at the processor for a currently pending quiesce request sequence, and thereafter resetting the I-AM-QUIESCED indicator, and the HOLD-QUSYS indicator at the processor to enable processing at the processor.

2. The computer program product of claim 1, wherein responsive to the quiesce request being other than of the fast-quiesce type, the method further comprises waiting for all processors of the computer system to enter the quiesced state, and during the waiting, handling, by the processor, any fast-quiesce interrupts which become pending at the processor.

3. The computer program product of claim 1, further comprising, responsive to the other processors of the computer system having entered the quiesced state, determining that the pending quiesce request sequence includes a total system quiesce request, and responsive thereto, waiting until no quiesce request of the total system quiesce type remains pending before resetting the I-AM-QUIESCED indicator and the HOLDQUSYS indicator at the processor, and during the waiting, handling, by the processor, any pending fast-quiesce interrupts which become pending at the processor.

4. The computer program product of claim 1, wherein the method further includes, responsive to no total system quiesce request being pending, determining whether the pending quiesce request sequence includes an early-release system quiesce request for the processor's partition within the computer system, and responsive to the pending quiesce request sequence not including the early-release system quiesce request for the processor's partition, blocking the system quiesce interrupts at the processor, otherwise, waiting for all system quiesce requests in the pending quiesce request sequence to be resolved before resetting the I-AM-QUIESCED indicator and the HOLDQUSYS indicator at the processor.

5. The computer program product of claim 1, further comprising issuing the quiesce request by another, initiating processor of the computer system, the issuing comprising:

issuing the quiesce request as a fast-quiesce type responsive to an associated initiating instruction comprising one of an IPTE, IDTE, SSKE or CSP/G instruction, and responsive to the quiesce request of a first quiesce type being blocked at the system controller of the computer system, issuing to the system controller, by the initiating processor, a quiesce request of an early-release system quiesce type to serialize quiesce requests at the system controller and produce the pending quiesce request sequence, and setting I-AM-QUIESCED indicator and the HOLD-QUSYS indicator at the initiating processor, waiting for the other processors of the computer system to enter the quiesced state, and during the waiting, handling by the initiating processor, any fast-quiesce interrupts which become pending at the initiating processor.

6. The computer program product of claim 5, further comprising waiting for no system quiesce request to be pending in the computer system before issuing the quiesce request of the fast-quiesce type, and wherein the initiating processor issues the quiesce request of the early-release system quiesce type responsive to the quiesce request of the fast-quiesce type being blocked by the system controller a predefined number of times.

7. The computer program product of claim 5, further comprising, responsive to the other processors of the computer system having entered the quiesced state, determining that the initiating processor has quiesce priority, and responsive thereto, issuing and completing by the initiating processor a quiesce-related operation, and thereafter, resetting its early-release system quiesce request.

8. The computer program product of claim 7, further comprising determining by the initiating processor whether the pending quiesce request sequence includes any system quiesce request, and responsive to the pending request sequence including a system quiesce request, waiting until no quiesce request of the system quiesce type remains pending before resetting the I-AM-QUIESCED indicator and the HOLDQUSYS indicator at the initiating processor, and during the waiting for no quiesce request of the system quiesce type to be being, handling, by the initiating processor, any fast-quiesce interrupts which become pending at the initiating processor.

9. The computer program product of claim 8, wherein issuing the quiesce request of the early-release system quiesce type is responsive, in part, to the initiating processor being other than in a hypervisor mode, and responsive, in part, to the initiating processor being in the hypervisor mode, issuing instead a quiesce request of a total system quiesce type.

10. The computer program product of claim 7, further comprising waiting by the initiating processor for any total system quiesce request in the pending quiesce request sequence to be processed before resetting its I-AM-QUIESCED and the HOLDQUSYS indicators, and during the waiting for no quiesce request of the total system quiesce type to be pending, handling, by the initiating processor, any fast-quiesce interrupts which become pending at the initiating processor.

11. A computer system comprising:
a memory; and
at least one processor in communications with the memory, wherein the computer system is configured to perform a method comprising:
determining whether a quiesce request received at a processor of the computer system is of a fast-quiesce type, and responsive to the quiesce request being of the fast-quiesce type, handling a fast-quiesce type interruption at the processor;
responsive to the quiesce request being other than of the fast-quiesce type, setting an I-AM-QUIESCED indicator and a HOLD-QUSYS indicator at the processor to, in part, inform a system controller of the computer system that the processor has entered a quiesced state, and determining whether other processors of the computer system have entered the quiesced state; and
responsive to the other processors of the computer system having entered the quiesced state, determining by the processor whether any total system quiesce requests are pending, and responsive to no total system quiesce request being pending, blocking system quiesce interrupts at the processor for a currently pending quiesce request sequence, and thereafter resetting the I-AM-QUIESCED indicator, and the HOLD-QUSYS indicator at the processor to enable processing at the processor.

12. The computer system of claim 11, wherein responsive to the quiesce request being other than of the fast-quiesce type, the method further comprises waiting for all processors of the computer system to enter the quiesced state, and during the waiting, handling, by the processor, any fast-quiesce interrupts which become pending at the processor.

13. The computer system of claim 11, further comprising, responsive to the other processors of the computer system having entered the quiesced state, determining that the pending quiesce request sequence includes a total system quiesce request, and responsive thereto, waiting until no quiesce request of the total system quiesce type remains pending before resetting the I-AM-QUIESCED indicator and the HOLDQUSYS indicator at the processor, and during the waiting, handling, by the processor, any pending fast-quiesce interrupts which become pending at the processor.

14. The computer system of claim 11, further comprising, responsive to no total system quiesce request being pending, determining whether the pending quiesce request sequence includes an early-release system quiesce request for the processor's partition within the computer system, and responsive to the pending quiesce request sequence not including the early-release system quiesce request for the processor's partition, blocking the system quiesce interrupts at the processor, otherwise, waiting for all system quiesce requests in the pending quiesce request sequence to be resolved before resetting the I-AM-QUIESCED indicator and the HOLDQUSYS indicator at the processor.

15. The computer system of claim 11, further comprising issuing the quiesce request by another, initiating processor of the computer system, the issuing comprising:

issuing the quiesce request as a fast-quiesce type responsive to an associated initiating instruction comprising one of an IPTE, IDTE, SSKE or CSP/G instruction, and responsive to the quiesce request of a first quiesce type being blocked at the system controller of the computer system, issuing to the system controller, by the initiating processor, a quiesce request of an early-release system quiesce type to serialize quiesce requests at the system controller and produce the pending quiesce request sequence, and setting the I-AM-QUIESCED indicator and the HOLD-QUSYS indicator at the initiating processor, waiting for the other processors of the computer system to enter the quiesced state, and during the waiting, handling by the initiating processor, any fast-quiesce interrupts which become pending at the initiating processor.

16. The computer system of claim 15, further comprising waiting for no system quiesce request to be pending in the computer system before issuing the quiesce request of the fast-quiesce type, and wherein the initiating processor issues the quiesce request of the early-release system quiesce type responsive to the quiesce request of the fast-quiesce type being blocked by the system controller a predefined number of times.

17. The computer system of claim 15, further comprising, responsive to the other processors of the computer system having entered the quiesced state, determining that the initiating processor has quiesce priority, and responsive thereto, issuing and completing by the initiating processor a quiesce-related operation, and thereafter, resetting its early-release system quiesce request.

18. A method of processing quiesce requests of a computer system, the method comprising:
   determining whether a quiesce request received at a processor of the computer system is of a fast-quiesce type, and responsive to the quiesce request being of the fast-quiesce type, handling a fast-quiesce type interruption at the processor;
   responsive to the quiesce request being other than of the fast-quiesce type, setting an I-AM-QUIESCED indicator and a HOLD-QUSYS indicator at the processor to, in part, inform a system controller of the computer system that the processor has entered a quiesced state, and determining whether other processors of the computer system have entered the quiesced state; and
   responsive to the other processors of the computer system having entered the quiesced state, determining by the processor whether any total system quiesce requests are pending, and responsive to no total system quiesce request being pending, blocking system quiesce interrupts at the processor for a currently pending quiesce request sequence, and thereafter resetting the I-AM-QUIESCED indicator, and the HOLD-QUSYS indicator at the processor to enable processing at the processor.

19. The method of claim 18, wherein responsive to the quiesce request being other than of the fast-quiesce type, the method further comprises waiting for all processors of the computer system to enter the quiesced state, and during the waiting, handling, by the processor, any fast-quiesce interrupts which become pending at the processor.

20. The method of claim 18, further comprising, responsive to the other processors of the computer system having entered the quiesced state, determining that the pending quiesce request sequence includes a total system quiesce request, and responsive thereto, waiting until no quiesce request of the total system quiesce type remains pending before resetting the I-AM-QUIESCED indicator and the HOLDQUSYS indicator at the processor, and during the waiting, handling, by the processor, any pending fast-quiesce interrupts which become pending at the processor.

* * * * *